(12) United States Patent
Higgins et al.

(10) Patent No.: US 10,455,283 B2
(45) Date of Patent: *Oct. 22, 2019

(54) EXTERNAL VIDEO MIXING CONTROL

(71) Applicant: IGT, Las Vegas, NV (US)

(72) Inventors: Kevin Higgins, Reno, NV (US);
William C. Little, Las Vegas, NV (US); Adrian R. Marcu, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,503

(22) Filed: Feb. 3, 2017

(65) Prior Publication Data

US 2017/0150216 A1 May 25, 2017

Related U.S. Application Data

(63) Continuation of application No. 13/536,640, filed on Jun. 28, 2012, now Pat. No. 9,564,000.
(Continued)

(51) Int. Cl.
*G06F 17/00* (2019.01)
*H04N 21/443* (2011.01)
(Continued)

(52) U.S. Cl.
CPC ....... *H04N 21/4438* (2013.01); *G07F 17/323* (2013.01); *G07F 17/3209* (2013.01);
(Continued)

(58) Field of Classification Search
CPC ........... H04N 21/4438; H04N 21/4781; H04N 21/23424; H04N 21/4316; H04N 5/45;
(Continued)

(56) References Cited

U.S. PATENT DOCUMENTS 5,889,499 A 3/1999 Nally et al.
6,652,378 B2 11/2003 Cannon et al.
(Continued)

OTHER PUBLICATIONS

European Search Report for European Application No. 12173551.8, dated Dec. 10, 2012.
(Continued)

*Primary Examiner* — Dmitry Suhol
*Assistant Examiner* — Carl V Larsen
(74) *Attorney, Agent, or Firm* — Neal, Gerber & Eisenberg LLP

(57) ABSTRACT

Techniques for allowing a gaming machine to exercise control over a picture-in-picture device (PIP mixer). A gaming machine includes a display device, a master game controller, the PIP mixer, and a PIP control interface. The master gaming controller is configured to execute a wager game, send a first video signal for the wager game to the PIP mixer, and send control instructions for controlling a display of one or more PIP windows to the PIP mixer via the PIP control interface. The PIP mixer receives the first video signal and a second video signal from an external source. The PIP mixer is configured to create a composite video image that includes display data of first video signal and the second video signal in PIP windows based on the control instructions. The composite video image is displayed on the display device.

20 Claims, 9 Drawing Sheets

Related U.S. Application Data

(60) Provisional application No. 61/502,814, filed on Jun. 29, 2011.

(51) Int. Cl.
| | | |
|---|---|---|
| *G07F 17/32* | (2006.01) | |
| *H04N 21/431* | (2011.01) | |
| *H04N 21/478* | (2011.01) | |
| *H04N 5/265* | (2006.01) | |
| *H04N 5/45* | (2011.01) | |
| *H04N 21/234* | (2011.01) | |
| *G06F 3/041* | (2006.01) | |

(52) U.S. Cl.
CPC ...... *G07F 17/3211* (2013.01); *G07F 17/3223* (2013.01); *G07F 17/3251* (2013.01); *H04N 5/265* (2013.01); *H04N 5/45* (2013.01); *H04N 21/23424* (2013.01); *H04N 21/4316* (2013.01); *H04N 21/4781* (2013.01); *G06F 3/041* (2013.01)

(58) Field of Classification Search
CPC . H04N 5/265; G07F 17/3211; G07F 17/3223; G07F 17/3251; G07F 17/3209; G06F 3/041
See application file for complete search history.

(56) References Cited

U.S. PATENT DOCUMENTS

| | | | |
|---|---|---|---|
| 6,769,989 B2 | 8/2004 | Smith et al. | |
| 6,908,387 B2 | 6/2005 | Hedrick et al. | |
| 6,939,226 B1 | 9/2005 | Joshi | |
| 7,112,138 B2 | 9/2006 | Hedrick et al. | |
| 7,749,079 B2 | 7/2010 | Chamberlain et al. | |
| 7,771,277 B2 | 8/2010 | Chamberlain et al. | |
| 7,819,742 B2 | 10/2010 | Chamberlain et al. | |
| 7,927,212 B2 | 4/2011 | Hedrick et al. | |
| 8,029,364 B2 | 10/2011 | Loose et al. | |
| 8,210,927 B2 | 7/2012 | Hedrick et al. | |
| 8,241,123 B2 | 8/2012 | Kelly et al. | |
| 8,241,124 B2 | 8/2012 | Kelly et al. | |
| 8,348,758 B2 | 1/2013 | Cram | |
| 8,435,120 B2 | 5/2013 | Hornik et al. | |
| 8,512,139 B2 | 8/2013 | Williams et al. | |
| 8,550,913 B2 | 10/2013 | Kelly et al. | |
| 8,622,838 B2 | 1/2014 | Hedrick et al. | |
| 8,632,406 B2 | 1/2014 | Hedrick et al. | |
| 2004/0082385 A1 | 4/2004 | Silva et al. | |
| 2004/0142739 A1 | 7/2004 | Loose et al. | |
| 2004/0254013 A1 | 12/2004 | Quraishi et al. | |
| 2005/0020358 A1 | 1/2005 | Cram | |
| 2005/0054423 A1 | 3/2005 | Wadleigh | |
| 2006/0019747 A1* | 1/2006 | Loose | G07F 17/32 463/30 |
| 2007/0105613 A1 | 5/2007 | Adams et al. | |
| 2007/0111787 A1 | 5/2007 | Adams et al. | |
| 2007/0243925 A1 | 10/2007 | Lemay et al. | |
| 2007/0243928 A1 | 10/2007 | Iddings | |
| 2007/0243934 A1 | 10/2007 | Little et al. | |
| 2008/0009344 A1 | 1/2008 | Graham et al. | |
| 2008/0125219 A1 | 5/2008 | Williams et al. | |
| 2008/0214308 A1* | 9/2008 | Lyons | G07F 17/32 463/42 |
| 2008/0274796 A1 | 11/2008 | Lube | |
| 2009/0104954 A1 | 4/2009 | Weber et al. | |
| 2009/0149254 A1* | 6/2009 | Kelly | G07F 17/3211 463/36 |
| 2009/0233705 A1 | 9/2009 | Lemay et al. | |
| 2010/0105454 A1 | 4/2010 | Weber et al. | |
| 2011/0065495 A1 | 3/2011 | Hornik et al. | |
| 2011/0195786 A1 | 8/2011 | Wells | |
| 2011/0195792 A1 | 8/2011 | Wells et al. | |
| 2011/0230262 A1 | 9/2011 | Shan | |
| 2012/0094753 A1 | 4/2012 | Petri | |
| 2013/0035157 A1 | 2/2013 | Weber et al. | |

OTHER PUBLICATIONS

European Examination Report for European Application No. 12173551.8, dated Dec. 11, 2014 (7 pages).

European Summons to Attend Oral Proceedings pursuant to Rule 115(1) EPC for European Application No. 12173551.8, dated Feb. 2, 2018.

* cited by examiner

EXTERNAL VIDEO MIXING CONTROL

PRIORITY CLAIM

This patent application is a continuation of and claims priority to and the benefit of U.S. patent application Ser. No. 13/536,640, which was filed on Jun. 28, 2012, which claims priority to and the benefit of U.S. Provisional Patent Application No. 61/502,814, which was filed on Jun. 29, 2011, the entire contents of each of which are incorporated herein by reference.

TECHNICAL FIELD

The present disclosure relates generally to wager-based gaming machines, and more specifically to the presentation of video data and the receipt of user input at wager-based gaming machines.

BACKGROUND

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually involves a player inputting money or indicia of credit into the gaming machine, indicating a wager amount, and initiating a game play. The gaming machine is configured to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

A gaming entity may provide gaming services to tens of thousands of users. For instance, a single land-based casino may include thousands of gaming machines. Player's gaming interests are constantly changing and the effort associated with providing fresh content to users is quite costly. The ability of a casino operator to maximize their operating profits and keep their customers happy is directly linked to their ability to provide new and desirable content. In view of the above, it would be desirable to provide gaming apparatus and methods that provide content to gaming machines from remote servers.

SUMMARY

Various implementations described or referenced herein are directed to gaming machines and methods implementing and using techniques for allowing a gaming machine to exercise control over a picture-in-picture device (or PIP mixer).

The PIP mixer receives a first video signal from the gaming machine and a second video signal from an external source. The PIP mixer may combine display data of the first video signal and the second video signal in various ways, such as in one or PIP windows. A PIP control interface allows the gaming machine to communicate with the PIP mixer. Via the PIP control interface, the gaming machine sends instructions to the PIP mixer for combining the display data.

In various implementations, the instructions may specify for the configuration or the display of the PIP windows. The instructions may come directly from the gaming machine. Alternatively, the instructions may originate as a request from a server or the external source. When the instructions do not originate from the gaming machine, the gaming machine may determine whether to fulfill the request. In one example, the determination may be based on the status of the gaming machine or of a wager game being executed on the gaming machine. When the gaming machine determines to fulfill the request, it may transmit an appropriate instruction to the PIP mixer via the PIP control interface.

In some implementations, a gaming machine (or EGM or gaming device) includes a display device, a master game controller, the PIP mixer, and a PIP control interface. The master gaming controller is configured to execute a wager game, which may result in the generation of an EGM video signal that includes display data for a wager game image. The master gaming controller is further configured to send the EGM video signal to the PIP mixer and to send control instructions for controlling a display of one or more PIP windows to the PIP mixer via the PIP control interface.

The PIP mixer includes an external source video input, an EGM video input and a PIP controller. The external source video input is configured to receive an external source video signal from an external source, the external source video signal including display data for the an external source image. The EGM video input is configured to receive the EGM video signal from the gaming machine. The PIP controller is configured to receive the external source video signal from the external source video input, receive the EGM video signal from the EGM video input, and receive the control instructions from the gaming machine via the PIP control interface. The control instructions provide for the creation of a composite video signal including display data for a composite video image. The composite video image includes the wager game image in a first PIP window and the external source image in one or more additional PIP windows. The PIP controller is further configured to create the composite video signal based on the control instructions, and send the composite video signal to the display device.

In some implementations, the gaming machine further includes a PUI peripheral interface configured to enable communication between the external source and the PIP mixer. The PIP controller is further configured to: receive peripheral instructions from the external source via the PUI peripheral interface, the peripheral instructions providing for the creation of the composite video signal; request an approval from the gaming machine to use the peripheral instructions; and responsive to receiving the approval, create the composite video signal in accordance with the peripheral instructions.

In some implementations, the master gaming controller of the gaming machine is further configured to: receive a request to configure a PIP window, wherein a configuration of a PIP window defines a size and a location of the PIP window on the display device; determine whether to fulfill the request based on a status of the wager game or a status of the gaming machine; and responsive to determining to fulfill the request, send the control instructions to the PIP mixer, the control instructions including an instruction for configuring the PIP window according to the request.

In some implementations, the request to configure the PIP window is received from the external source. The request may be received at the EGM from the external source via the PIP mixer. The request to configure the PIP window may also be received from a system host, or other server, communicatively connected with the gaming machine.

In some implementations, the PIP controller is further configured to: responsive to receiving the control instructions for configuring the PIP window, store the configuration of the PIP window in a memory.

In some implementations, the PIP controller is further configured to: responsive to a request from the external source, send the configuration of the PIP window to the external source; or responsive to a request from a system host or the gaming machine, send the configuration of the PIP window to the system host or the gaming machine.

In some implementations, the master gaming controller of the gaming machine is further configured to: receive a request to control a PIP window; determine whether to fulfill the request based on a status of the wager game or a status of the gaming machine; and responsive to determining to fulfill the request, send the control instructions to the PIP mixer, the control instructions including an instruction for controlling the display of the PIP window according to the request.

In some implementations, the control instructions indicate opening, closing, creating, destroying, configuring, sizing, resizing, moving, location, hiding, displaying, vertical ordering, or content of the PIP window in the composite screen image.

In some implementations, the request to control the PIP window is received from the external source. The request may be received at the EGM from the external source via the PIP mixer. The request to control the PIP window may also be received from a system host, or other server, communicatively connected with the gaming machine.

In some implementations, the display device includes a touch screen. The PIP controller is further configured to: receive touch screen data from the touch screen; determine whether the touch screen data corresponds with the wager game image or the external source image; responsive to determining that the touch screen data corresponds with the wager game image, send the touch screen data to the gaming machine; and responsive to determining that the touch screen data corresponds with the external source image, send the touch screen data to the external source.

In some implementations, the PIP controller is further configured to send a status message regarding an operating condition of the PIP mixer or an operating condition of a peripheral device connected with the PIP mixer to the gaming machine via the PIP control interface.

In some implementations, the PIP controller is further configured to send a status message regarding the operating condition of the PIP mixer or an operating condition of a peripheral device connected with the PIP mixer to the external source via a PUI peripheral interface, the PUI peripheral interface configured to enable communication between the external source and the PIP mixer.

In some implementations, the PIP controller is further configured to receive a software update for the PIP mixer or a peripheral device connected with the PIP mixer from the gaming machine via the PIP control interface.

In some implementations, the PIP controller is further configured to receive a software update for the PIP mixer or a peripheral device connected with the PIP mixer from the external source via a PUI peripheral interface, the PUI peripheral interface configured to enable communication between the external source and the PIP mixer.

In some implementations, a system includes a gaming machine, a PUI board, and a PUI peripheral interface. The PUI board is one example of an external source. The PUI peripheral interface is configured to enable communication between the PUI board and the PIP mixer. The PUI board is configured to: receive media host data from a media host, create the external source video signal by processing the media host data, and send the external source video signal to the PIP mixer via the PUI peripheral interface.

In some implementations, the PIP controller is further configured to: receive peripheral instructions from the PUI board via the PUI peripheral interface, the peripheral instructions providing for the creation of the composite video signal; request an approval from the gaming machine to use the peripheral instructions; and responsive to receiving the approval, create the composite video signal in accordance with the peripheral instructions.

In some implementations, a method allows a gaming machine to control a PIP mixer. The method includes: receiving, with one or more microprocessors, an external source video signal from an external source, the external source video signal generated by the external source and including display data for an external source image; receiving, with the one or more microprocessors, a EGM video signal from a gaming machine, the EGM video signal generated by the gaming machine and including display data for a wager game image; receiving, with the one or more microprocessors, the control instructions from the gaming machine, the control instructions providing for the creation of a composite video signal including display data for a composite video image, the composite video image including the wager game image in a first PIP window and the external source image in one or more additional PIP windows; creating, with the one or more microprocessors, the composite video signal based on the control instructions, and sending the composite video signal to a display device.

In some implementations, the method further includes: receiving peripheral instructions from the external source, the peripheral instructions providing for the creation of the composite video signal; requesting an approval from the gaming machine to use the peripheral instructions; and responsive to receiving approval, creating the composite video signal in accordance with the peripheral instructions.

In some implementations, the control instructions include a request to configure a PIP window and wherein a configuration of a PIP window defines a size and a location of the PIP window on the display device.

In some implementations, the method further includes storing the configuration of the PIP window in a memory.

In some implementations, the method further includes: responsive to a request from the external source, sending the configuration of the PIP window to the external source; or responsive to a request from a system host or the gaming machine, sending the configuration of the PIP window to the system host or the gaming machine.

In some implementations, the control instructions indicate opening, closing, creating, destroying, configuring, sizing, resizing, moving, location, hiding, displaying, vertical ordering, or content of a PIP window in the composite screen image.

In some implementations, the display device includes a touch screen. The method further includes: receiving touch screen data from the touch screen; determining whether the touch screen data corresponds with the wager game image or the external source image; responsive to determining that the touch screen data corresponds with the wager game image, send the touch screen data to the gaming machine; and responsive to determining that the touch screen data corresponds with the external source image, send the touch screen data to the external source.

In some implementations, a method includes: receiving, at a gaming machine, a request from an external source to control a PIP mixer, the gaming machine configured to execute a wager game and generate an EGM video signal including display data for a wager game image. The PIP mixer is configured to: receive an external source video signal, the external source video signal generated by the external source and including display data for an external source image, receive the EGM video signal, receive the control instructions from the gaming machine, the control instructions providing for the creation of a composite video signal including display data for a composite video image, the composite video image including the wager game image in a first PIP window and the external source image in one or more additional PIP windows, create the composite video signal based on the control instructions, and send the composite video signal to a display device.

The method further includes: determining, at the gaming machine, whether to fulfill the request from the external source; and responsive to determining to fulfill the request, sending the control instructions to the PIP mixer, the control instructions including an instruction providing for the creation of the composite video signal according to the request.

In some implementations, determining whether to fulfill the request from the external source to control the PIP mixer is based on a status of the wager game or a status of the gaming machine.

In some implementations, the request indicates a configuration of a PIP window and wherein the configuration of a PIP window defines a size and a location of the PIP window on the display device.

In some implementations, the request indicates opening, closing, creating, destroying, configuring, sizing, resizing, moving, location, status, vertical ordering, or content of a PIP window.

In some implementations, a non-transitory tangible computer-readable storage medium stores instructions executable by a computing device to perform a method. The method includes: receiving, with one or more microprocessors, an external source video signal from an external source, the external source video signal generated by the external source and including display data for an external source image; receiving, with the one or more microprocessors, a EGM video signal from a gaming machine, the EGM video signal generated by the gaming machine and including display data for a wager game image; receiving, with the one or more microprocessors, the control instructions from the gaming machine, the control instructions providing for the creation of a composite video signal including display data for a composite video image, the composite video image including the wager game image in a first PIP window and the external source image in one or more additional PIP windows; creating, with the one or more microprocessors, the composite video signal based on the control instructions, and sending the composite video signal to a display device.

In some implementations, a PIP mixer includes: an external source video input configured to receive an external source video signal from a PUI board, the external source video signal including display data for an external source image; an EGM video input configured to receive the EGM video signal from the gaming machine, the EGM video signal generated by the gaming machine and including display data for a wager game image; means for receiving control instructions from the gaming machine, the control instructions providing for the creation of a composite video signal including display data for a composite video image, the composite video image including the wager game image in a first PIP window and the external source image in one or more additional PIP windows; means for creating the composite video signal based on the control instructions, and means for sending the composite video signal to a display device.

BRIEF DESCRIPTION OF THE DRAWINGS

The included drawings are for illustrative purposes and serve only to provide examples of possible structures and process steps for the disclosed subject matter. These drawings in no way limit any changes in form and detail that may be made to implementations by one skilled in the art without departing from the spirit and scope of the disclosure.

DETAILED DESCRIPTION

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

In some implementations, techniques described herein allow an electronic gaming machine ("EGM" or "gaming machine") to exercise control over a picture-in-picture (PIP) device (or "PIP mixer"). The PIP mixer is configured to receive video data generated by the EGM and video data provided by an external source to form a composite display screen image. The composite display screen image may then be provided to a display device associated with the EGM.

Figure 1:
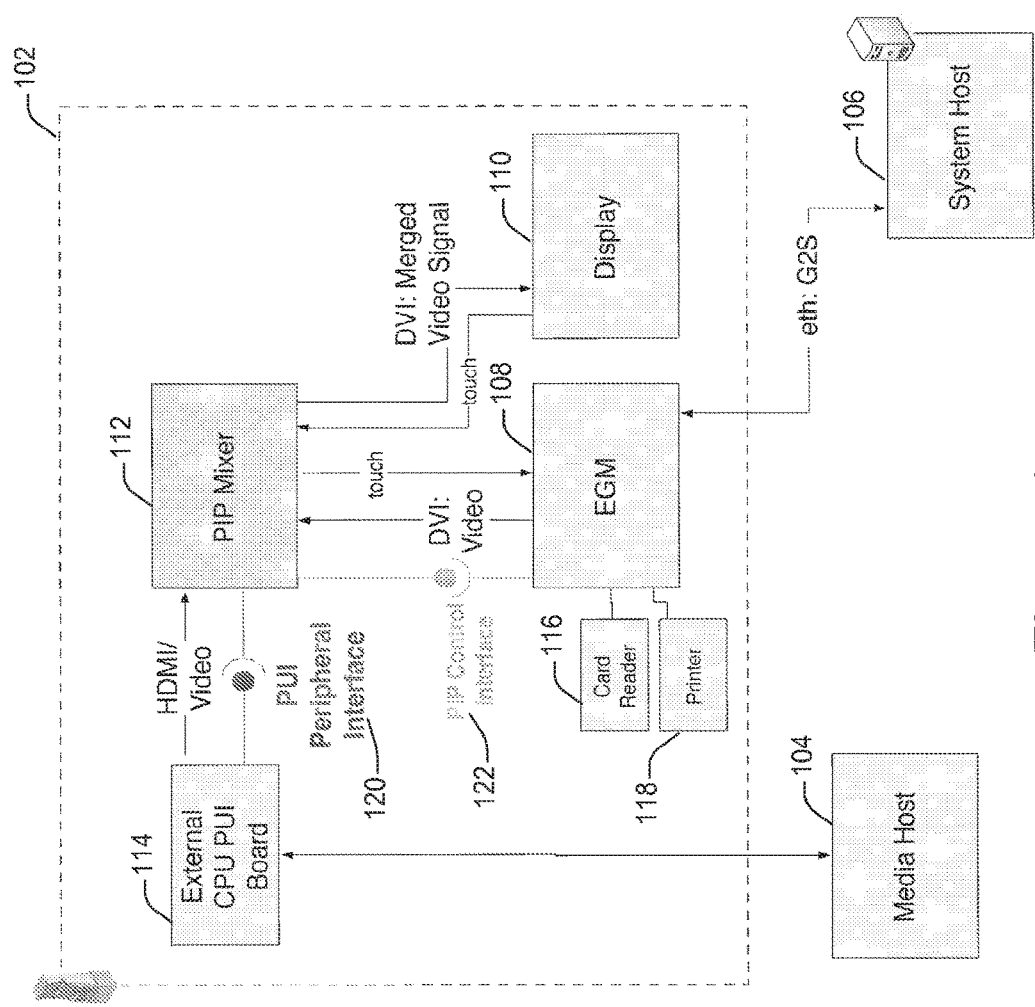
FIG. 1 shows a block diagram of an example of a system for providing one or more PIP windows at a gaming machine, according to some implementations.

FIG. 1 shows a block diagram of an example of a system for providing one or more PIP windows at a gaming machine, configured according to some implementations. The system shown in FIG. 1 includes a gaming machine cabinet 102, a media host 104, a system host 106, an EGM 108, a display device 110, a PIP mixer 112, a player user interface (PUI) board 114 (or "external computer (CPU) PUI board"), a card reader 116, a printer 118, a PUI peripheral interface 120, and a PIP control interface 122.

The gaming machine cabinet 102 may include a variety of components used in conjunction with presenting a game of chance or with presenting other features associated with the EGM 108. The gaming machine cabinet 102 need not include all components shown in FIG. 1. Conversely, the gaming machine cabinet 102 may include other components not shown in FIG. 1. Additional details regarding EGM components are discussed with respect to FIGS. 7-8B. Furthermore, it will be appreciated that components shown in FIG. 1 as being included within the gaming machine cabinet 102 may be physically located outside or on the surface of the gaming machine cabinet 102. Some components, such as the display device 110, may be only partially enclosed within the gaming machine cabinet 102.

At 112, the PIP mixer is shown. In some implementations, the PIP mixer 112 may include a PIP controller including one or more processors and a memory. The PIP controller may be "configured to" perform various functions, meaning that the memory stores computer code that is executable by the one or more processors to perform the discussed functions. For instance, the PIP controller may be configured to merge two or more video inputs to produce a combined video signal for display on a display device. The PIP mixer may be configured to receive the video inputs in various formats or connection types, such as HDMI, DVI, VGA, USB, serial, or co-axial cable.

As discussed above, one of the video inputs received at the PIP mixer 112 may be transmitted from the EGM 108. This video input of the PIP mixer 112 may be referred to as an EGM video input. The video signal received from the EGM may include video data related to primary game play, bonusing, game outcomes, credit balances, credit transfers, or any other information generated in the course wager game play on the EGM 108. The video data generated by the EGM may provide a wager game image when displayed on the display screen of the display device 110. The wager game image is carried by an EGM video signal to the PIP mixer 112. FIG. 1 shows the EGM video input having a DVI format, but it will be appreciated that other formats or connection types may be used.

Also as discussed above, one of the video inputs received at the PIP mixer 112 may be transmitted from an external source, such as the PUI board 114 shown in FIG. 1. This video input of the PIP mixer 112 may be referred to as an external source video input. The external source may provide video data related to player tracking, bonusing, food and beverage ordering interfaces, side games, streaming sports wagering or display interfaces, casino services, credit balances, credit transfers, advertisements or other types of information that does not affect an outcome of a wager game executed by the EGM. The video data generated by the external source may provide an external source image when displayed on the display screen of the display device 110. The external source image is carried by an external source video signal to the external source video input of the PIP mixer 112. FIG. 1 shows the external source video input having an HDMI format, but it will be appreciated that other formats or connection types may be used.

The PIP mixer 112 may combine the wager game image received from the EGM 108 and the external source image received from the external source, such as the PUI board 114, in various ways to generate the composite display screen image prior to sending it to the display device 110. Typically, the wager game image is displayed in a first window, or wager game window. While the wager game image is displayed in the wager game window that occupies a portion of the display device, an external source image may be displayed in a second window, or external source window that occupies a second portion of the display device.

At various times, the gaming window or the external source window may occupy the entire display device (e.g., in a full screen mode) or a portion of the display device. One common type of external source window is called a "service window," which may be used to provide interactive customer service interfaces. For instance, an external source image may provide a full screen kiosk mode that allows the player to utilize service-related functions provided by the casino, such as ordering food and beverages, accessing player tracking account information, executing balance transfers, or the like. The kiosk mode may be initiated by the EGM 108, by the external video source, based on user input provided in an EGM-controlled portion of the display device, based on user input provided in an external source controlled portion of the display device, based on user input provided in a wager game portion of the device, based on user input provided at another user input device associated with the EGM, or via any other initiation mechanism.

In some implementations, the external source video signal may carry video data that provides for simultaneous display of multiple external source images (i.e., multiple images generated by the external source). Furthermore, each external source image may be displayed in separate external source windows. In some implementations, some or all of the external source images may share an external source window.

In some implementations, the EGM video signal may carry video data that provides for simultaneous display of multiple wager game images (i.e., images generated by the EGM). Typically, one of the wager game images includes the wager game while other wager game images provide additional content. The wager game image that includes the wager game may be displayed in the gaming window. The additional content, which is discussed in further detail below, may be displayed in one or more EGM-controlled windows.

To accommodate the display of additional windows that share the display screen of the display device 110, an existing window may be scaled, shrunk, moved, resized, compressed, or otherwise manipulated by the PIP mixer. For instance, the wager game window may be scaled to a smaller size to accommodate the display of an external source window. In another example, both the wager game window and the external source window may be scaled to accommodate the display of a second external source window or an EGM-controlled window. External source windows, gaming windows and EGM-controlled windows may be generally referred to as picture-picture (PIP) windows.

In some implementations, PIP windows may have different priority levels for access to the display device 110. If displaying a higher priority level PIP window requires a lower priority PIP window to become compressed to an unacceptable degree, the EGM 108 may transmit an instruction to the PIP mixer 112 to close or resize the lower priority PIP window. Typically, but not necessarily always, an external source window will have lower priority than a wager game window.

The PIP mixer 112 may communicate with the EGM 108 via the PIP control interface 122. In some implementations, messages sent from the EGM 108 to the PIP mixer 112 via the PIP control interface 122 may utilize the G2S Message Protocol or some other standard communication protocol. The PIP control interface 122 may be utilized to transmit information such as status messages, touch input, and instructions for controlling the display of PIP windows between the PIP mixer 112 and the EGM 108

As discussed, PIP mixer 112 may receive the instructions for controlling the display of PIP windows from the EGM 108 via the PIP control interface 122. Instructions for controlling the display of PIP windows may also be transmitted to the PIP mixer 112 from the external source, such as the PUI board 114, or from the system host 106. In some implementations, when the instructions do not come directly from the EGM 108, the PIP mixer 112 may not perform operations in accordance with the instructions unless a validation instruction approving the operation is received from the EGM 108 through the PIP control interface 122.

The instructions may be used by the PIP mixer 112 to configure a PIP window, which includes defining the parameters of the PIP windows such as its size, location on the display device 110, or the like. In some implementations, PIP window configurations may be stored at the PIP mixer 112, the EGM 108, or the external source. These stored PIP window configurations may later be used to present wager game images, external source images or EGM-controlled images.

The instructions may direct the PIP mixer 112 to perform one or more of the following once PIP windows are configured: closing a PIP window, opening a PIP window, resizing a PIP window, moving a PIP window, changing a status of a PIP window (e.g., whether the PIP window is displayed or hidden), assigning the full display screen to a PIP window, displaying EGM-generated content within a PIP window, displaying externally-generated content within a PIP window, manipulation of the Z-ordering (in an X, Y, and Z computer graphics ordering system) of windows such that a first PIP window displays above or below a second PIP window, and manipulation of the X-ordering or Y-ordering. After executing the instructions, PIP Mixer 112 may convey the impact of the instructions to the PUI Board 114. For instance, if the PIP mixer 112 closed a PIP window, a message may be sent to the PUI board 114 via the PUI peripheral interface 120 indicating to the PUI board 114 that the PIP window may be used for other content.

In some implementations, the EGM 108 may transmit an instruction or message to the PIP mixer 112 based on the state of the EGM 108 or the state of wager game play on the EGM 108. For example, the EGM 108 may be in a game state in which the player's full attention on the game may be desired. Such situations may include, but are not limited to, displaying a game outcome, displaying a game event, displaying a bonus game, displaying an error condition, displaying an EGM-controlled image, and displaying funds transfer information. As another example, the EGM may be in a fault or failure state and need the entire game screen to display an error message. This example may be particularly important in situations where the external source window is occupying the entire display screen. In such situations, the player may not even be aware of the fault or failure of the EGM 108. By transmitting an instruction to close the external source window and display an error message, the player may be made aware of the fault or failure.

In some implementations, the PIP control interface 122 may be used to transmit status information between the PIP mixer 112 and the EGM 108. For instance, the PIP mixer 112 may transmit a heartbeat message or status message identifying a status or operating condition of the PIP mixer 112 to the EGM 108. Such a heartbeat message may allow the EGM 108 to determine whether the PIP mixer 112 is still operating and to determine the operating condition of the PIP mixer 112. In some implementations, the PIP mixer 112 may also send a status message to the EGM 108 that indicates the status of a component connected to the PIP mixer, such as the display device 110, the touch screen, or other peripheral, such as a bill validator or a ticket printer. The PIP mixer 112 may also receive a heartbeat or status message identifying a status or operating condition of the EGM 108. For instance, the PIP mixer 112 may receive a message indicating that the EGM 108 is in a failure state.

At 108, the EGM is shown. In at least the context of FIG. 1, the EGM 108 includes core game-related components that provide for a wager game such as game software, a master gaming controller and a network interface. However, the gaming cabinet 102 includes other components, such as the PIP mixer 112 and the PUI board 114, that are not considered within the scope of the EGM as described in FIG. 1.

The master gaming controller of the EGM 108 may include one or more processors and the one or more storage mediums. The master gaming controller may be configured to perform the functionality of the EGM 108 described herein. It will be appreciated that the master gaming controller is "configured to" perform a certain function when the one or more storage mediums include computer code that is executable by the one or more processors to perform the function. As discussed above, one function of the master gaming controller may include providing the game of chance. Additional details regarding the components and operations of the EGM are discussed with respect to FIGS. 7-8B.

In some implementations, and as discussed above, the EGM 108 may also provide a wager game image to the PIP mixer 112 that includes the additional content that does not include content of the wager game. Also as discussed above, the additional content in the wager game image may be displayed in an EGM-controlled window. The EGM may generate the video data for the EGM-controlled images by processing content received from a remote server, such as the system host 106.

At 106, the system host is shown. The system host 106 may communicate with the EGM 108 to provide content for one or more EGM-controlled windows. It will be appreciated that the content of EGM-controlled windows is not limited to information associated with a wage game. In various implementations, EGM-controlled windows may provide any of the functionality described herein with respect to external source windows. In some implementations, the content from the system host 106 may also be used by the EGM 108 to provide various features to the gaming window.

Because EGM-controlled windows are provided via the execution of content on the EGM, such as by the master game controller, new EGM-controlled content may require regulatory approval before it is put in commercial use. Furthermore, the system host 106 may communicate with the EGM 108 via a standard communication interface such as the G2S Message Protocol. For instance, the system host 106 may send a message to the EGM 108 via the G2S Message Protocol that directs the EGM 108 to download content and to generate the EGM-controlled images. Standard communication interfaces may include predefined data and message types that restrict the ability to add new features that were not contemplated during the design of the standard communication interface. For these and other reasons, the use of the PUI board 114 for providing new content from the media host 104 may be a more desirable technique for implementing new features to gaming machines than the use of EGM-controlled content from the system host 106.

At 114, the PUI board is shown. The PUI board 114 is an example of an external source that provides the external source video signal to the PIP mixer 112. The PUI board 114 is a computing device that is external and separate from the EGM or its components. With reference to FIG. 1, the PUI board 114 receives and processes content provided by the media host 104, or multiple media hosts, to generate the external source video signal. The content received from the media host 104 may be media content, such as Flash® player content. In some instances, a single media host may provide content for one or more external source windows. In other instances, separate media hosts may provide content for separate external source windows. In yet other instances, more than one media host may provide content for a single external source window.

The media host 104 may be controlled by a casino, by the EGM manufacturer, by the manufacturer of the PUI board 114, by a third party, or by any other entity. The content provided by the media host 104 to the PUI board 114 may include content for the external source windows. As shown in FIG. 1, the media host 104 may be configured to communicate with the PIP mixer 112 via the PUI board 114.

In some implementations, the external source is a media host that provides the external source video signal directly to the PIP mixer 112. Put another way, the structures or functions described herein for the PUI board 114 may be integrated into the media host 104. Alternatively, the structures or functions of the PUI board 114 may be integrated into the PIP mixer 112.

At 120, the PUI peripheral interface is shown. The PUI peripheral interface 120 may be configured to transmit information such as status messages, touch input, or instructions for controlling the display of PIP windows.

The PUI board 114, via the PUI peripheral interface 120, may transmit instructions similar to the configuration and control instructions discussed above with respect to the PIP control interface 122. Also as discussed above, in some implementations, when the instructions do not come directly from the EGM 108, the PIP mixer 112 may not perform operations in accordance with the instructions unless a validation instruction approving the operation is received from the EGM 108.

In some implementations, the PUI peripheral interface 120 may be used to receive status information from the PIP mixer 112, such as information indicating an operating status or error condition of the PIP mixer 112, the EGM 108, or any component connected to the PIP mixer, such as the display device 110, the touch screen, or other peripheral, such as a bill validator or a ticket printer. This status information may be further passed from the PUI board 114 to the media host 104. For instance, the PIP mixer 112 may send a heartbeat message regarding itself or the EGM 108 to the PUI board 114. In another example, an action by the PIP mixer 112 specified by instructions from the EGM 108 may affect the display of one or more external source windows driven by the PUI board 114, or may indicate changes that would affect the ability for the PUI Board 114 to direct the PIP Mixer 112 to display external source images in one or more external source windows. Here, a status message may be sent to the PUI board 114 after the PIP mixer 112 has performed the action.

In some implementations, the PUI board 114 may perform operations related to player tracking In this case, the PUI board may include, may be, or may function in a manner similar to a slot machine interface board (SMIB). The PUI board 114 may control or interface with one or more player tracking components such as a secondary display device, the card reader 116, the printer 118 or other player tracking input or output devices.

When the PUI board 114 is configured to perform operations related to player tracking, the PUI board 114 may be configured to communicate directly with the EGM 108. In some implementations, the PUI board 114 and the EGM 108 may directly exchange information via the SAS, G2S, or other protocol. In one example, The PUI board 114 may receive meter values at from the EGM 108. In another example, the PUI board 114 and the EGM 108 may exchange information such as credit balance transfers, for instance to facilitate cashless gaming funds transfers conducted via the card reader 116. Player tracking information received by the PUI board 114 from the EGM 108 may be further routed to a media host that is configured to provide player tracking services.

At 110, the display device is shown. The display device 110 may be configured to display a video signal provided by the PIP mixer 112. The video signal may include a composite screen image that includes wager game images, external source images, and EGM-controlled images.

In some implementations, the gaming machine cabinet 102 may include more than one display. For instance, the gaming machine cabinet 102 may include a main game display device and a bonus game display device located in a top box. Any or all of the display devices may be represented by the display device 110 shown in FIG. 1. Furthermore, any or all of the display devices may be configured to receive video data from the PIP mixer 112.

In some implementations, the display device 110 includes a touch screen capable of receiving user inputs when a user touches a surface of the display device 110. The user input may include screen coordinates that correspond with a location on the touch screen. In some implementations, the touch screen may be configured for multi-touch cap ability.

Generally, the touch screen allows the user to interact with PIP windows. The PIP mixer 112 may receive the touch input from the display device 110 and route the touch input to an appropriate location. For instance, PIP mixer 112 may determine that the touch input concerns a wager game window or EGM-controlled window, in which case the touch input may be routed to the EGM 108 via the PIP control interface 122. Alternatively, the PIP mixer 112 may determine that the touch input concerns an external source window, in which case the touch input may be routed to the PUI board 114 via the PUI peripheral interface 120.

When the touch input is sent to the PUI board 114, the PUI board 114 may translate the touch input to assign a meaning to the touch input. For instance, the touch input may indicate the press of a button displayed in the external source window. The PUI board 114 may assign a meaning to the touch events based on the location and timing of the touch events. Once the meaning is assigned, it may be used to affect operations at the media host 104 resulting in changes to content of the external source window.

When the touch input is sent to the EGM 108, the EGM 108 may also translate the touch input to assign a meaning to the touch input. For instance, the touch input may indicate the press of a button displayed in the wager game window or EGM-controlled window. The EGM 108 may assign a meaning to the touch events based on the location and timing of the touch events. Once the meaning is assigned, it may be used to affect operations at the EGM 108 or the system host 106, resulting in changes to content of the wager game window or EGM-controlled window.

In some implementations, the PIP mixer 112 may perform touch scaling. If a touch input is received within a scaled PIP window, the PIP mixer 112 may translate the coordinates of the touch input to coordinates for the content had the content not been scaled or displayed in a window prior to sending the touch input to the EGM 108 or the PUI board 114.

At 116, the card reader is shown. In some implementations, the card reader 116 may be configured to communicate with a player tracking card. The player tracking card may identify a player tracking account, which may provide access to player tracking features such as player tracking points and identification information.

In some implementations, the card reader 116 may be configured to communicate with a smart card configured for cashless gaming. The card reader 116 may thus be configured to facilitate credit balance transfers between the smart card and the EGM.

In some implementations, information related to the player tracking card or the smartcard may be displayed in a PIP window. For instance, the PIP window may display player tracking information or information related to a credit balance or credit transfer.

In some implementations, the card reader 116 may be configured to communicate with the PUI board 114 instead of, or in addition to, the EGM 108. For instance, the PUI board 114 may include the SMIB configured to control player tracking or cashless gaming components.

In some implementations, the printer 118 may be configured to print various information related to operations at the EGM 108. For example, the printer 118 may be configured to print a cashless gaming cashout ticket. When such a ticket is printed, the player may take the ticket to another location in the casino to receive funds in exchange for the ticket. As another example, the printer 118 may be configured to print a coupon or other promotional item.

In some implementations, the printer 118 may be configured to communicate with the PUI board 114 instead of, or in addition to, the EGM 108. For instance, the PUI board 114 may include the SMIB configured to control player tracking or cashless gaming components.

In some implementations, the EGM 108 or the external source, such as the PUI board 114, may provide software or firmware updates to the PIP mixer 112. The software updates or firmware updates may include updates for the PIP mixer 112 or of the devices connected to the PIP Mixer 112, such as the display device 110, the touch screen, or some other peripheral. In some implementations, peripheral devices controlled by the EGM, such as the card reader 116, printer 118, bill validator, etc. may also be updated via the PIP mixer 112. For instance, a connection between the peripheral devices controlled by the EGM and the PIP mixer may be established. The EGM 108 may send instructions to the PIP mixer 112 via the PIP control interface 122 to control the downloading of the gaming machine peripherals. In some implementations, software or firmware updates for the PUI board 114 may also be controlled by the EGM 108 via the PIP mixer 112.

In some implementations, techniques described herein may facilitate the integration of a wager game images and an external source image without requiring significant alteration to an existing or legacy EGM hardware or software. For instance, the EGM may not natively support the display of external source windows. In such situations, one solution may be to modify the EGM. This may require the EGM to be altered to include specialized software (e.g., an Adobe® Flash® player, a Microsoft® Silverlight® player) or hardware (e.g., processors and memory) dedicated to processing the content from the external source.

However, this solution may not be ideal as EGM software and hardware is highly regulated and any modifications may require another round of regulatory approval before commercial use. Therefore, the PUI board 114 may be used to receive the content from a media host and process that content to generate an external source image for an external source window. The external source image may be sent to the PIP mixer 112 where it may be combined with the wager game image. Such a configuration may allow, for instance, an outdated gaming machine to integrate new functionality without a costly regulatory approval process.

In another example, content from the external source may be displayed on the display device 110 without requiring the EGM game software to be altered to include specialized communication protocols for receiving the content. For instance, the EGM 108 may be positioned in a gaming system that uses a third-party proprietary communication protocol to transmit the content from a media host to gaming machines. In such a situation, a hardware device capable of communicating using the proprietary communication protocol, such as the PUI board 114, may be used to receive the content from the media host. The PUI board 114 may then process the content to create the external source video signal that is sent to the PIP mixer 112, thereby bypassing the EGM game software.

In some implementations, communication between the EGM 108 and the PIP mixer 112 may be conducted at least in part for regulatory reasons. For instance, a gaming regulation may require that a base game be disabled if an external source controls the entire screen of the display device 110. In this situation, a message indicating that the external source is controlling the entire display screen may be transmitted from the PIP mixer 112 to the EGM 108. Then, the EGM 108 may disable the game software. Further, the EGM 108 may indicate in a log that the disabling of the game software was performed due to the control of the display screen by the external source, and the EGM 108 may also transmit this information via another external interface (G2S, SAS, or other casino gaming protocol) for consumption by the casino management system for long-term historical logging or auditing purpose.

In some implementations, two or more of the various communication connections shown in FIG. 1 may be transmitted over the same physical interface. For instance, communications between the EGM 108 and the PIP mixer 112 regarding touch screen data and data sent via the PIP control interface 122 may be transmitted via the same physical communication connection such as a USB interface, a serial communication interface, a SATA interface, a PATA interface, a SCSI interface, or any other communication interface. Alternately, such communication connections may be transmitted over different physical communication connections.

FIGS. 2-6 show diagrams of examples of methods for exercising control of the PIP mixer and PIP windows by the EGM, performed according to some implementations. As discussed herein, various messages may be transmitted between the various components. The selection and arrangement of these messages may be strategically determined based on the desired behavior of the system. Thus, the methods shown in FIGS. 2-6 are examples of the types of methods that may be performed and are not to be construed as limiting in any way. Furthermore, it will be appreciated that the methods shown in FIGS. 2-6 may be performed by the example of systems discussed above, but may also be performed by other systems or devices.

Figure 2:
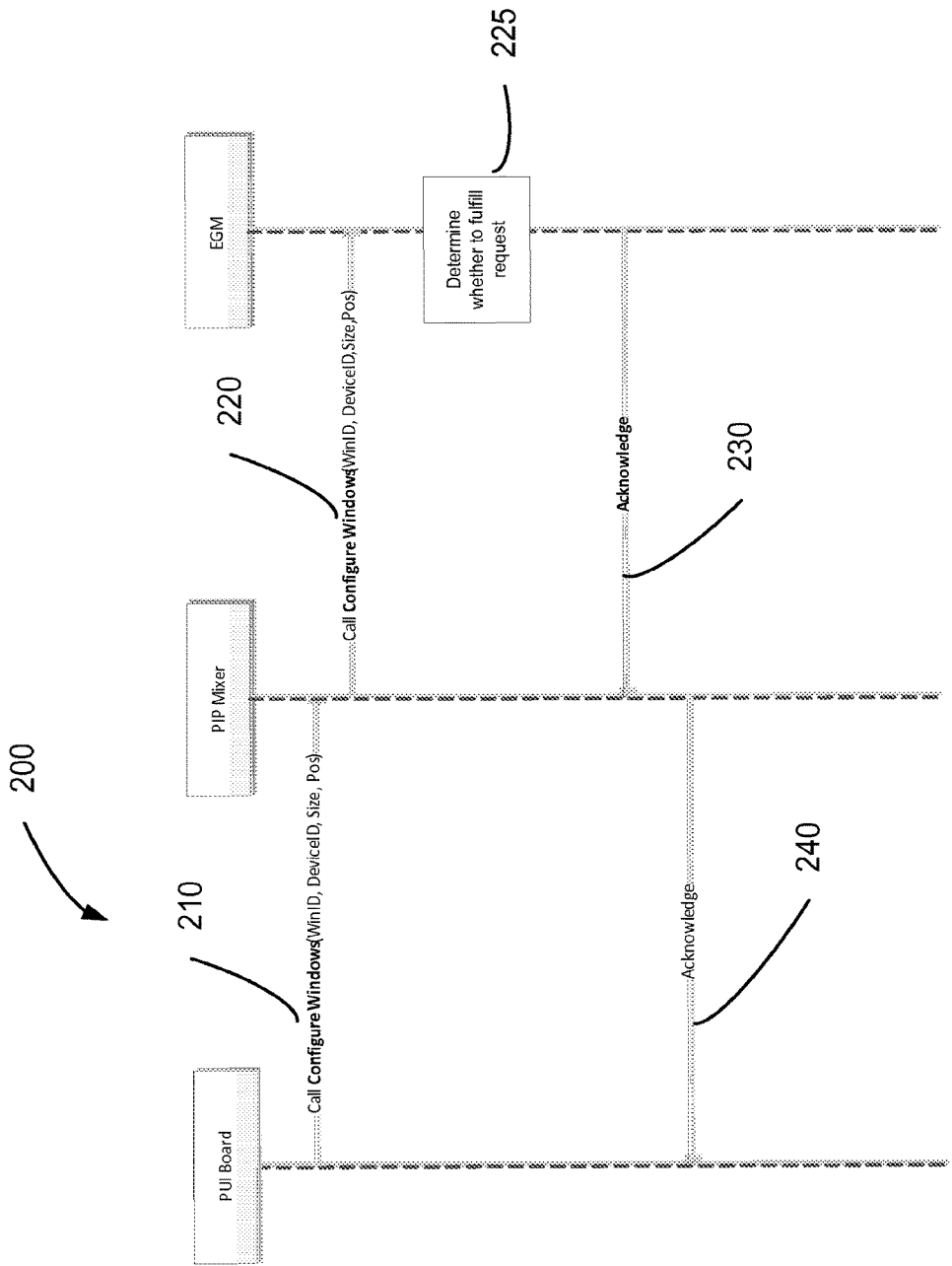
FIG. 2 shows a sequence diagram of an example of a method for configuring PIP windows, performed according to some implementations.

FIG. 2 shows a sequence diagram of an example of a method 200 for configuring PIP windows, such as an external source window, a wager game window or an EGM-controlled window, performed according to some implementations. The method shown in FIG. 2 allows the external source, such as the PUI board, to define parameters of a PIP window. The messages shown in FIG. 2 may be transmitted between the PIP mixer, the EGM, and a processing device for the external source such as the PUI board. Because the PUI board provides video data for external source windows, the method 200 is typically used to configure a PIP window that will be used as an external source window. However, it will be appreciated that once a PIP window is configured, it may be later called and used as a wager game window, an external source window or an EGM-controlled window.

In FIG. 2, the PUI board sends a message 210 to the PIP mixer with a request to configure a PIP window. The message 210 may originate from the media host or be sent by the PUI board as a result of a request from the media host. In some implementations, the message 210 includes a PIP window identifier (WinID), a device identifier (DeviceID), a PIP window size attribute (Size), and a PIP window position attribute (Pos).

In some implementations, the message 210 may be sent via the PUI peripheral interface. The message 210 may also be sent using a standard communication protocol such as the GSA standard protocol. One example of a GSA standard protocol is the GDS Media Window standard protocol. The device identifier DeviceID may correspond with the display device 110, thereby indicating that the PIP window is to be displayed on the display device 110. In some implementations, the system of FIG. 1 may include additional display devices configured to receive video from the PIP mixer and each device may have a unique DeviceID.

The PIP mixer receives the message 210 and sends a message 220 to the EGM. The message 220 may include a request to configure the PIP window. In some implementations, the message 220 may contain the same data as the message 210. In some implementations, the message 220 may use a different communication protocol than the message 210. The message 220 may be sent via the PIP control interface.

The EGM may send to the PIP mixer a message 230 acknowledging the configuration of the PIP window as acceptable to the EGM. Alternatively, the EGM may determine in a determination 225 that the configuration is unacceptable and the message 230 may indicate that the configuration is unacceptable. The determination 225 may be based on any number of factors including the status of a wager game executing on the EGM or the status of the EGM. In some implementations, the message 230 is sent without performing the determination 225. The message 230 may be sent via the PIP control interface. In some implementations, the PIP mixer includes or has access to a memory where configuration data for an accepted PIP window may be stored.

The PIP mixer may send a message 240 to the PUI board. The message 240 may be sent via the PUI peripheral interface. In some implementations, the message 240 may contain the same contents as the message 230. In some implementations, the message 240 is sent using a standard communication protocol. The message 240 may indicate to the PUI board whether it may utilize the PIP window configured by the PUI board in message 210. The PUI board may further send the message 240 to the media host to indicate to the media host whether it may utilize the service window.

Figure 3:
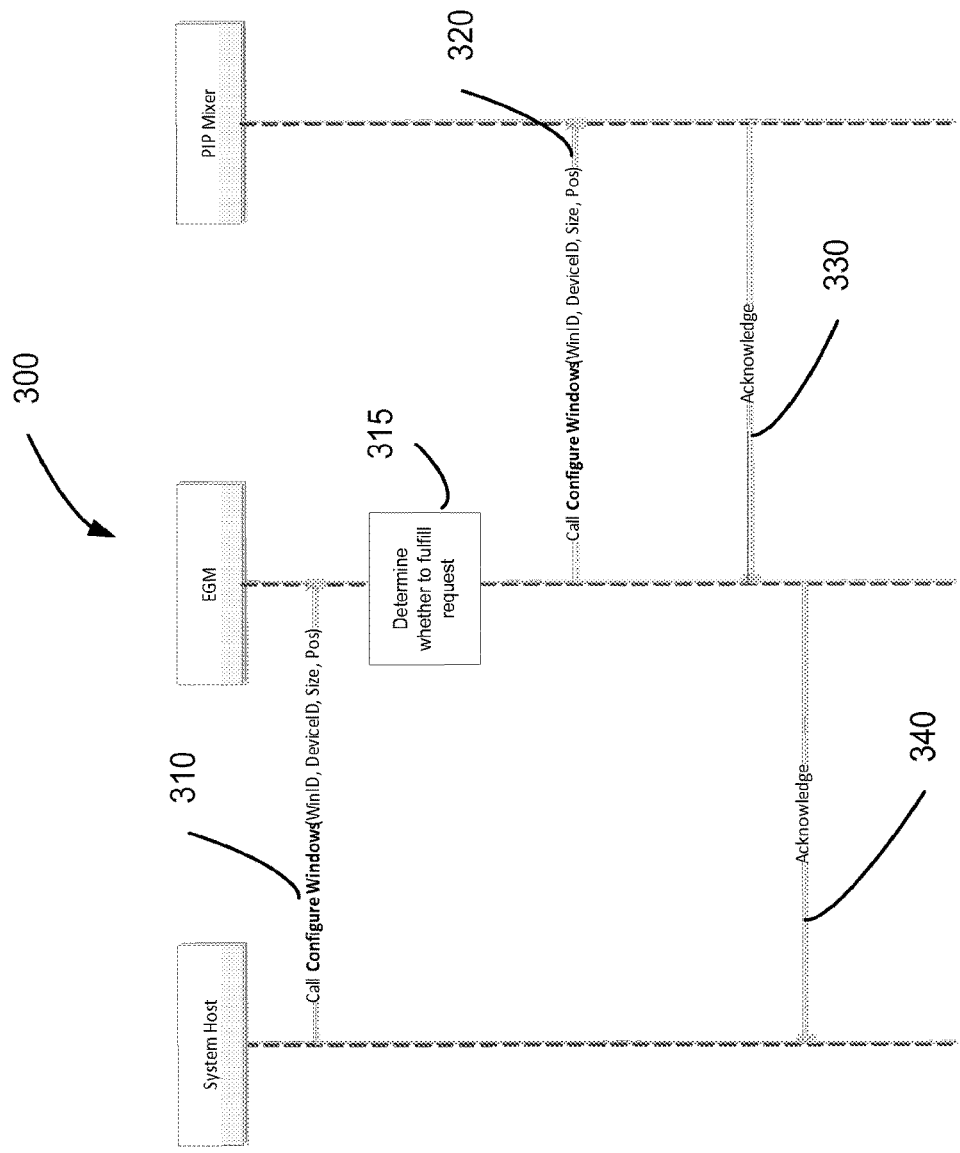
FIG. 3 shows a sequence diagram of another example of a method for configuring PIP windows, performed according to some implementations.

FIG. 3 shows a sequence diagram of an example of a method 300 for configuring PIP windows, performed according to some implementations. The method shown in FIG. 3 allows the system host to define parameters of a PIP window. The messages shown in FIG. 3 may be transmitted between the system host, the EGM and the PIP mixer. Because the system host provides content for EGM-controlled windows, the method 300 is typically used to configure a PIP window that will be used as an EGM-controlled window. However, it will be appreciated that once a PIP window is configured, it may be later called and used as a wager game window, an external source window or an EGM-controlled window.

In FIG. 3, the system host sends a message 310 to the EGM with a request to configure a PIP window. In some implementations, the message 310 includes a PIP window identifier (WinID), a device identifier (DeviceID), a PIP window size attribute (Size), and a PIP window position attribute (Pos). In some implementations, the message 310 may be sent using a standard communication protocol such as a GSA standard protocol. One example of a GSA standard protocol is the G2S Message Protocol. The device identifier DeviceID may correspond with display device 110, indicating that the PIP window is to be displayed on the display device 110. In some implementations, the system of FIG. 1 may include additional display devices configured to receive video from the PIP mixer and each device may have a unique DeviceID.

The EGM receives the message 310 and may send to the PIP mixer a message 320 requesting the configuration of the PIP window. Alternatively, the EGM may determine that the configuration is unacceptable in a determination 315 and the message 320 is not sent. The determination 315 may be based on any number of factors including the status of a wager game executing on the EGM or the status of the EGM. In other implementations, the message 320 is sent without performing the determination 315. In some implementations, the message 320 may contain the same data as the message 310. In some implementations, the message 320 may use a different communication protocol than the message 310. In some implementations, the request for configuration of the PIP window may originate at the EGM with the message 320 rather than the system host with message 310. The message 320 may be sent from the EGM to the PIP mixer via the PIP control interface.

The PIP mixer receives the message 320 and may send a message 330 to the EGM acknowledging the configuration of the PIP window as acceptable to the PIP mixer. The message 330 may be sent via the PIP control interface. In some implementations, the PIP mixer includes or has access to a memory where configuration data that defines properties or configurations of PIP windows may be stored.

The EGM may receive the message 330 and send a message 340 to the system host acknowledging the configuration of the service window as acceptable. In some implementations, message 340 uses a standard communications protocol, such as the G2S Message Protocol.

Figure 4:
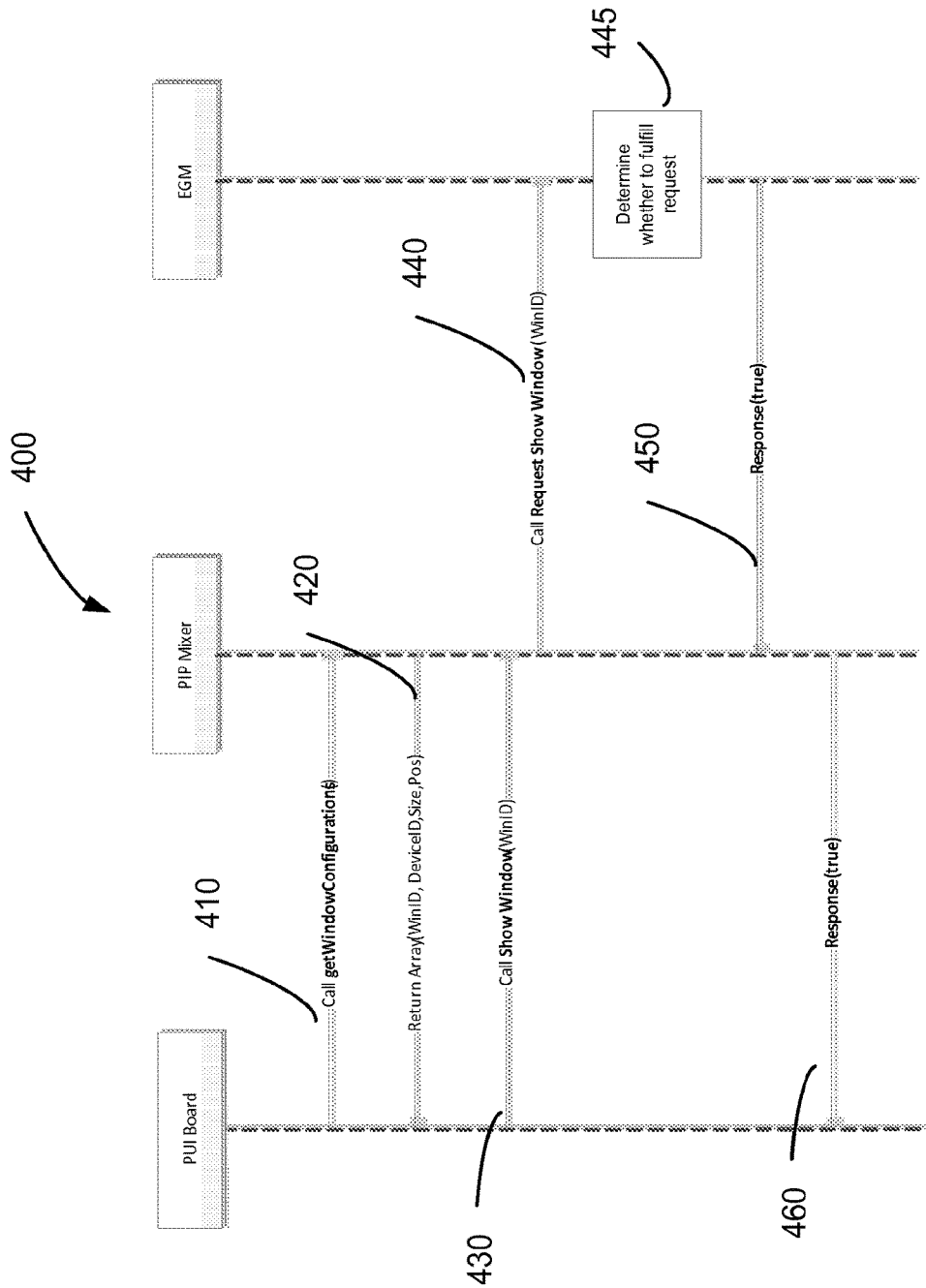
FIG. 4 shows a sequence diagram of an example of a method for controlling PIP windows, performed in accordance with some implementations.
Figure 5:
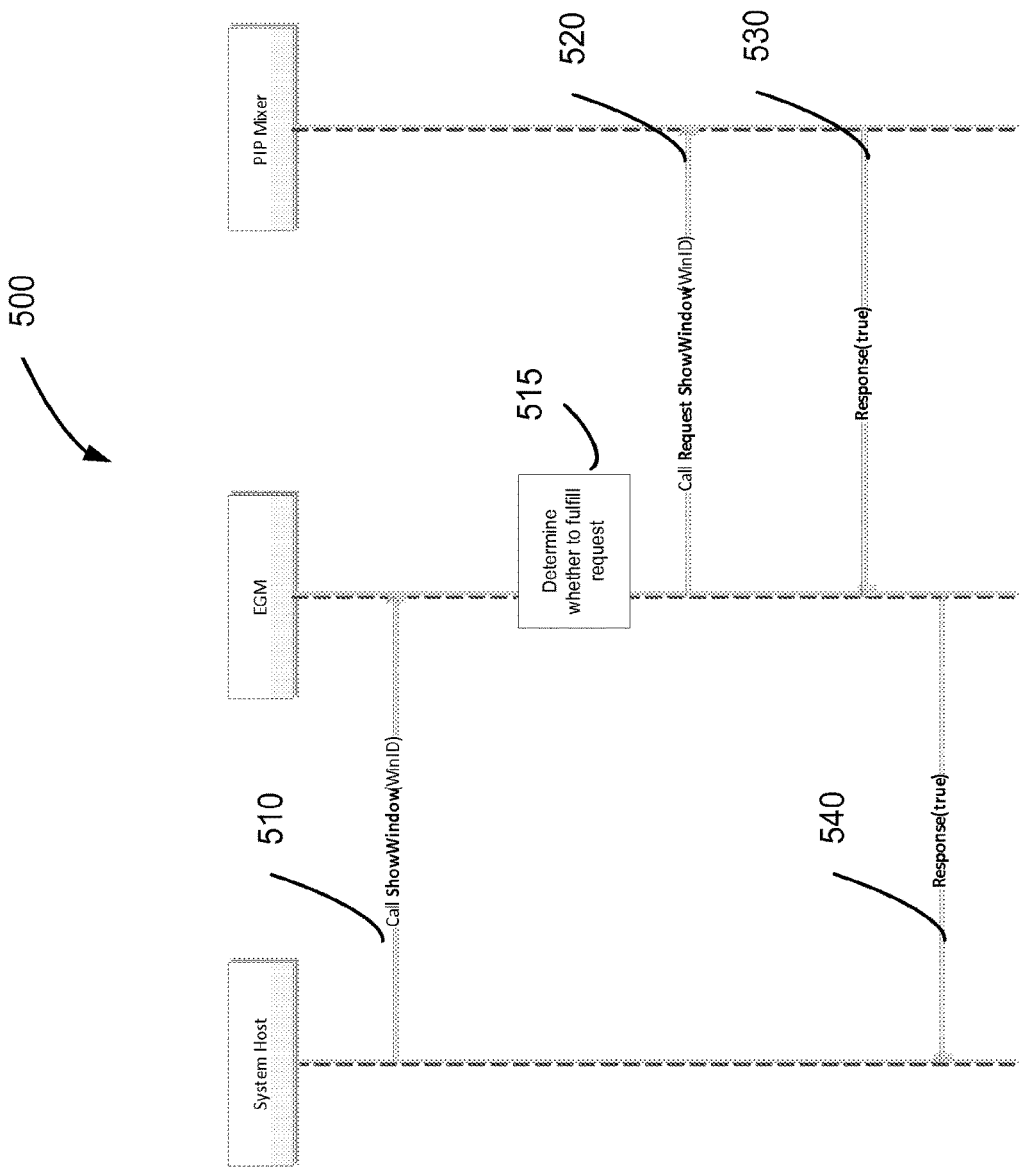
FIG. 5 shows a sequence diagram of another example of a method for controlling PIP windows, performed in accordance with some implementations.

In some implementations, the example methods shown in FIGS. 2 and 3 for configuring a PIP window may be combined with the example methods shown in FIGS. 4 and 5 for controlling a configured PIP window for display on the display device.

FIG. 4 shows a sequence diagram of an example of a method 400 for controlling PIP windows, performed in accordance with some implementations. The method 400 may be performed after a PIP window has been configured using the example methods 200 and 300 shown in FIGS. 2 and 3 respectively.

In FIG. 4, the PUI board sends a message 410 to the PIP mixer requesting a list or array of configured PIP windows. In some implementations, the PIP mixer includes or has access to the memory for storing configured PIP windows. The PIP mixer may return a message 420 to the PUI board, the message 420 including the list or array of configured PIP windows. In some implementations, the messages 410 and 420 are sent via the PUI peripheral interface. The messages 410 and 420 may further use a standard communication protocol such as the GDS Media Window standard protocol.

In some implementations, the messages 410 and 420 do not need to be performed. For instance, if the PUI board originally sent the message configuring the PIP window, such as the message 210 shown in FIG. 2, the service window configuration may be stored at the PUI board or the media host making it unnecessary for the PUI board to request the list or array from the PIP mixer.

When the PUI board has the list or array of configured PIP windows, the PUI board may send a message 430 to the PIP mixer with a request to show a PIP window. In some implementations, the message 430 may include the PIP window identifier WinID. WinID may correspond with the PIP window identifier used in the methods 200 and 300 and the message 420. The message 430 may be sent using a standard communication protocol, such as the GDS Media Window standard protocol. The message 430 may be sent via the PUI peripheral interface.

While FIG. 4 shows the message 430 requesting to show the PIP window ("Show Window(WinID)"), it will be appreciated that the message 430 may include any other PIP window related command. For instance, the message 430 may indicate the opening, closing, creating, destroying, sizing, resizing, moving, location, status, vertical ordering, or content of the PIP window.

The PIP mixer receives the message 430 and sends a message 440 to the EGM. The message 440 may include the request to show the PIP window. In some implementations, the message 440 may contain the same data as the message 430. In some implementations, the message 440 may use a different communication protocol than the message 430. The message 440 may be sent via the PIP control interface.

In response to receiving the message 440, the EGM may send a message 450 to the PIP mixer indicating whether the EGM allows the request in message 440. In some implementations, the EGM may determine that the request cannot be fulfilled in a determination 445 and the message 450 is not sent. The determination 445 may be based on any number of factors including the status of a wager game executing on the EGM or the status of the EGM. For instance, the EGM may determine that it needs the entire screen for the gaming window and the message 450 may indicate that the PIP window may not be shown. In this case, the EGM may return a false value in message 450. The EGM may determine that showing the PIP window is permissible and the message 450 may indicate that the PIP window may be shown. The EGM may return a true value in the message 450 in this case. The message 450 may be sent via the PIP control interface.

In some implementations, the PIP mixer may send a message 460 to the PUI board. The message 460 may contain some or all of the same data or contents as the message 450. However, the message 460 may use a different communication protocol than the message 450. The message 460 may be sent from the PIP mixer to the PUI board via the PUI peripheral interface. The message 460 may indicate to the PUI board that further action with the PIP window may be performed. For instance, if the message 460 indicates that the PIP window is shown, the message 460 may further indicate that the PUI board may use the PIP window. In another example, if the message 460 indicates that the PIP window is closed, the message 460 may further indicate that the PUI board may not use the PIP window.

FIG. 5 shows a sequence diagram of an example of a method 500 for controlling PIP windows, performed in accordance with some implementations. The method 500 may be performed after a PIP window has been configured, e.g., using the methods 200 or 300.

In FIG. 5, the system host may send a message 510 to the EGM requesting the EGM show a PIP window. The message 510 may reference a configured PIP window by using WinID. In some implementations, the message 510 may use a standard communications protocol such as the G2S Message Protocol.

The EGM receives the message 510 and sends a message 520 to the PIP mixer requesting it to show the PIP window. In some implementations, the EGM may determine that the request cannot be fulfilled in a determination 515 and the message 520 is not sent. The determination 515 may be based on any number of factors including the status of a wager game executing on the EGM or the status of the EGM. The message 520, if determined to be sent, may be sent from the EGM to the PIP mixer via the PIP control interface.

In some implementations, the request for showing the PIP window may originate at the EGM. Thus the method may begin with the message 520 sent by the EGM to the PIP mixer. Furthermore, while FIG. 5 shows the message 520 requesting to show the PIP window ("ShowWindow(WinID)"), the message 520 may include any other PIP window related command. For instance, the message 520 may indicate the opening, closing, creating, destroying, sizing, resizing, moving, location, status, vertical ordering, or content of the PIP window.

In response to receiving the message 520 indicating a request to show the PIP window, the PIP mixer may return a response 530 to the EGM. In some implementations, the response 530 may indicate that the PIP mixer can display the PIP window and return true. The response 530 may also indicate that the PIP mixer cannot display the PIP window and return false. The message 530 may be sent via from the PIP mixer to the EGM via the PIP control interface.

The EGM receives the message 530 and may send a message 540 to the system host. In some implementations, the message 540 is sent to the system host only if the system host requested the show window request in the message 510. In some implementations, the message 540 may use a standard communications protocol such as the G2S Message Protocol. The message 540 may indicate to the system host that the PIP window is shown or is available to receive content from the system host.

Figure 6:
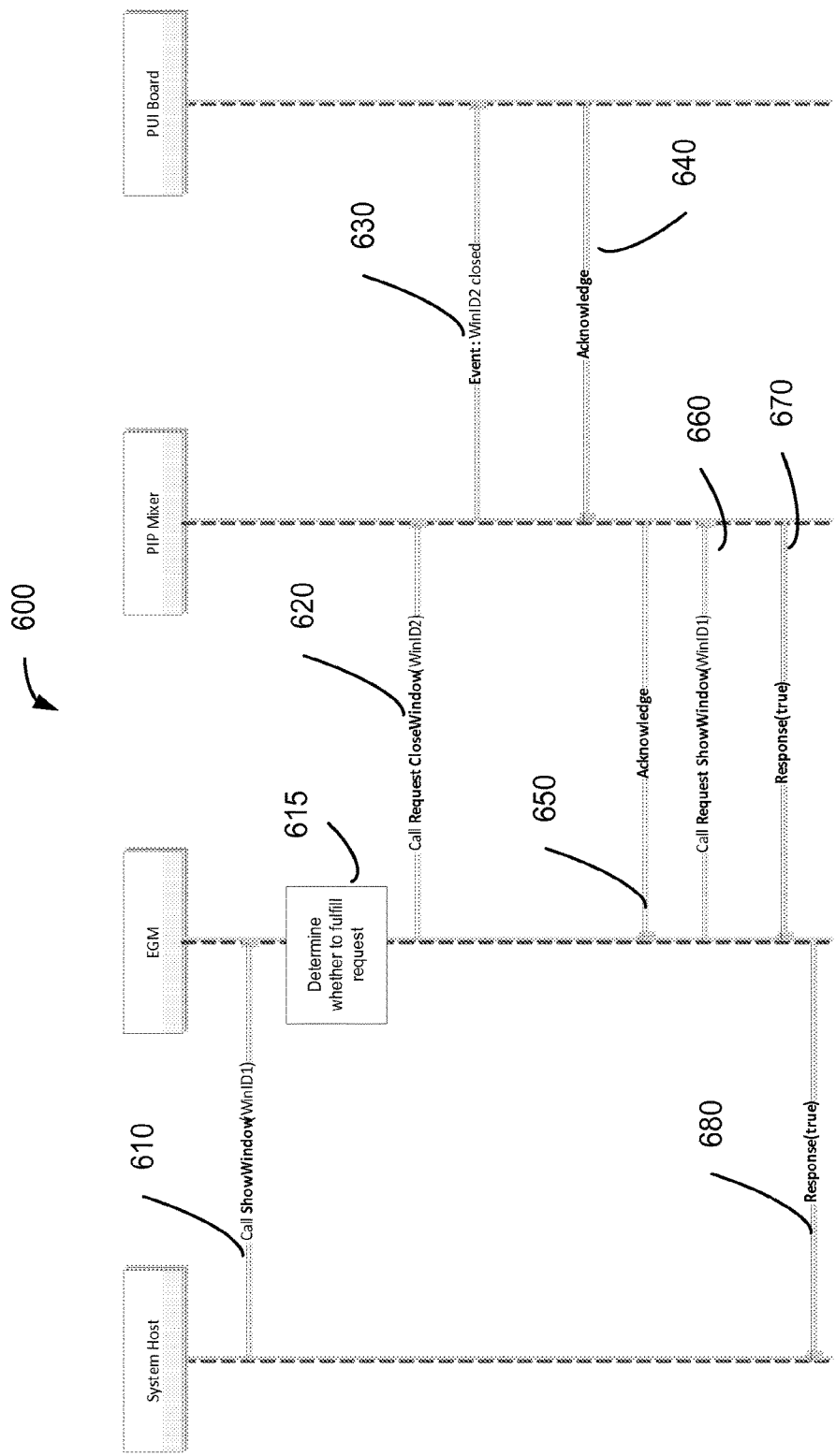
FIG. 6 shows a sequence diagram of another example of a method for controlling PIP windows, performed in accordance with some implementations.

FIG. 6 shows a sequence diagram of an example of a method 600 for controlling PIP windows, performed in accordance with some implementations. The method 600 allows the EGM or the system host to control a shown or displayed PIP window. The method 600 may be combined with or performed after one or more PIP window has been configured, e.g., using the methods 200 or 300. In the example shown in FIG. 6, two PIP windows WinID1 and WinID2 have been configured. The method 600 may also be combined with or performed after a PIP window has been displayed, e.g., using the methods 400 or 500. In the example method shown in FIG. 6, PIP window WinID2 is displayed prior to the system host sending a message 610 to the EGM.

With reference to FIG. 6, the system host sends the message 610 requesting to show the PIP window WinID1, which is configured but not displayed. In some implementations, the message 610 may use a standard communications protocol such as the G2S Message Protocol.

The EGM receives the message 610 and sends a message 620 to the PIP mixer requesting it to close the PIP window WinID2. In some implementations, the EGM may only send the message 620 after determining in a determination 615 that showing the PIP window WinID1 is impermissible or impossible without closing the PIP window WinID2. In some implementations, the EGM may determine in the determination 615 that it may show the PIP window without closing WinID2 and send a show request message for WinID1, such as a message 660 shown in FIG. 6. The determination 615 may be based on the state of a wager game. The message 620 may be sent via the PIP control interface.

In some implementations, the request for closing the PIP window may originate at the EGM. Thus the method 600 may begin with the message 620 sent by the EGM to the PIP mixer. Furthermore, while FIG. 6 shows the message 620 requesting to close the PIP window WinID2 ("CloseWindow (WinID2)"), the message 620 may include any other PIP window related command that the EGM may determine is necessary before it can show WinID1. For instance, the message 620 may indicate the closing, destroying, sizing, resizing, moving, location, status, vertical ordering, or content of the PIP window WinID2

If the PIP window WinID2 is being used by the PUI board to provide content, the PIP mixer may send a message, or event 630 to the PUI board indicating that PUI Window WinID2 is closed, or is going to be closed. The PUI board may then acknowledge receipt of the event in message 640. The messages 630 and 640 may use a standard communication protocol, such as the GDS Media Window standard. The messages 630 and 640 may also use the PUI peripheral interface.

The PIP mixer may send a message 650 to the EGM acknowledging that the PIP mixer has closed the PIP window WinID2. The message 650 may use the PIP control interface.

In response to receiving the message 650, the EGM may send a message 660 to the PIP mixer requesting to show PIP window WinID1. The message 650 may use the PIP control interface.

The PIP mixer may return a response 670 to the EGM. In some implementations, the response 670 may indicate that the PIP mixer can display the PIP window WinID1 and return true. The response 670 may also indicate that the PIP mixer cannot display the PIP window WinID1 and return false. The message 670 may be sent via the PIP control interface.

The EGM receives the message 670 and may send a message 680 to the system host indicating that PIP window WinID1 is shown or is available for receiving content from the system host. In some implementations, the message 680 is sent to the system host only if the system host requested the show window request in the message 610. In some implementations, the message 680 may use a standard communications protocol such as the G2S Message Protocol.

Figure 7:
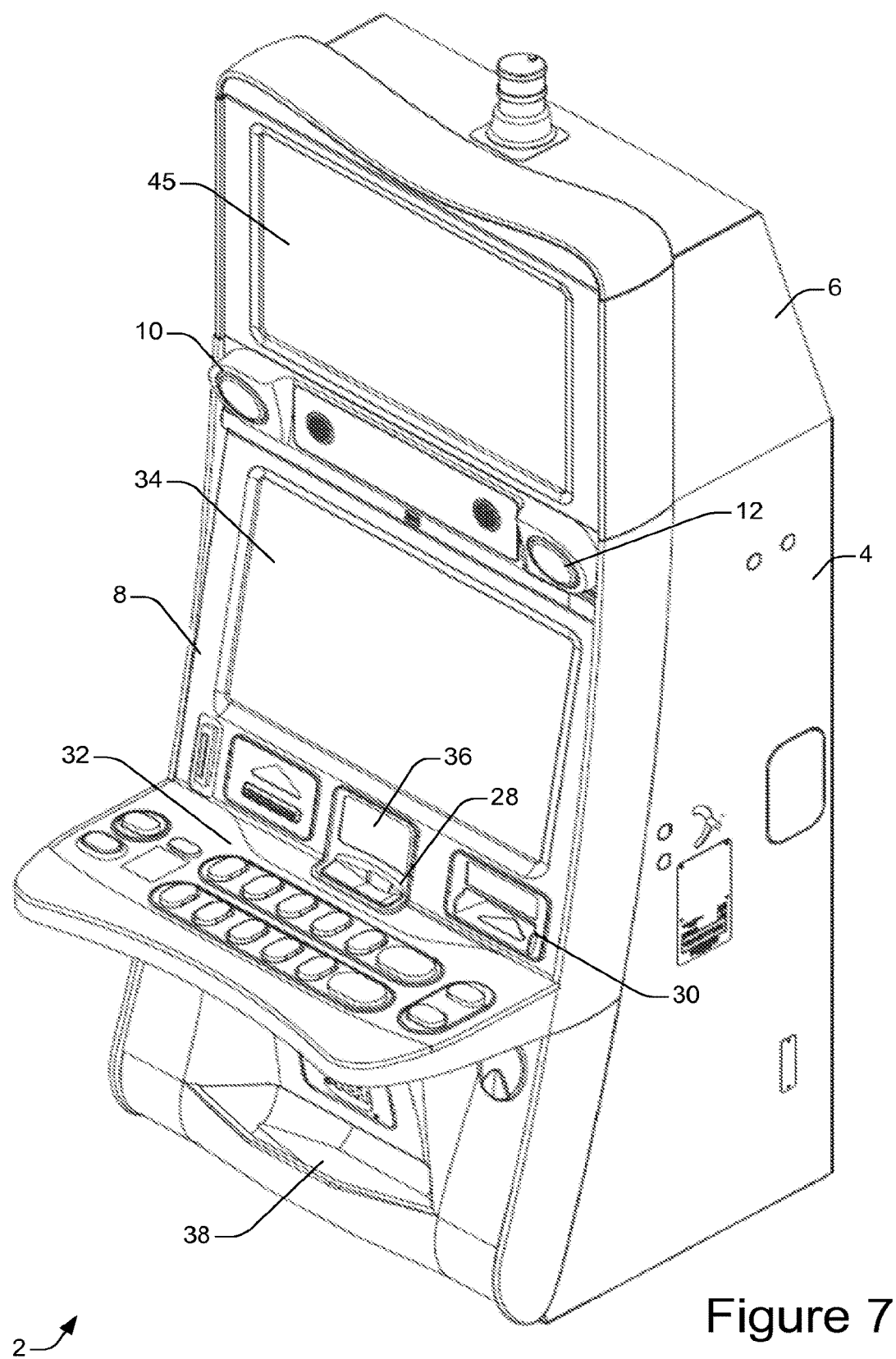
FIGS. 7, 8A and 8b show perspective, front, and side views of diagrams of an example of a gaming machine, configured in accordance with some implementations.
Figure 8A:
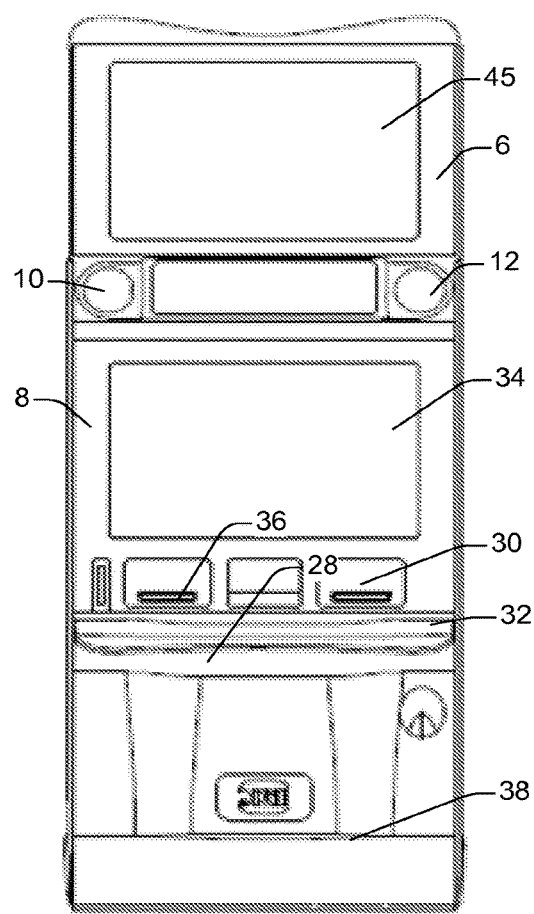
Figure 8B:
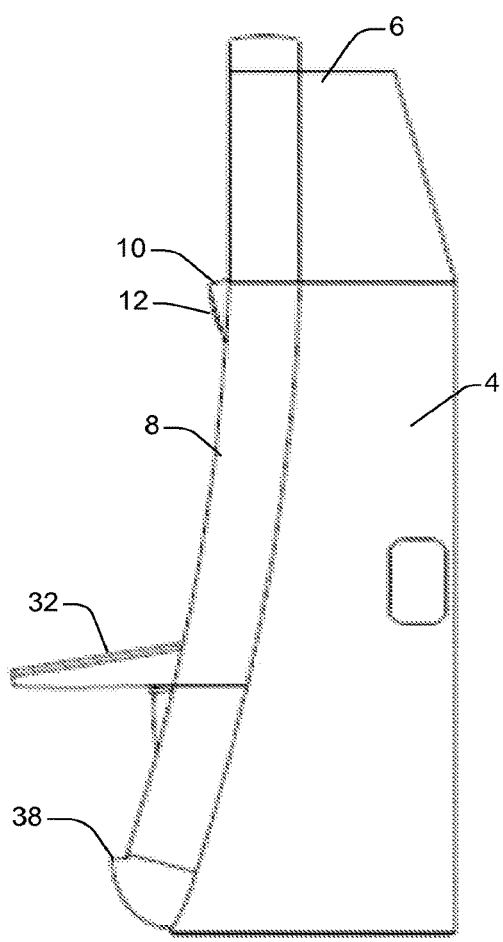

FIGS. 7, 8A, and 8B show perspective, front, and side views of diagrams of an example of an EGM 2 configured in accordance with some implementations. As illustrated in FIGS. 7, 8A, and 8B, the EGM 2 includes a main cabinet 4 (also referred to as the gaming machine cabinet 102 in FIG. 1), which generally surrounds the machine interior and is viewable by users. The main cabinet 4 includes a main door 8 on the front of the EGM 2, which opens to provide access to the interior of the EGM 2.

In some implementations, the EGM 2 may include any of a plurality of devices. For example, the EGM 2 may include a ticket printer that prints bar-coded tickets, a key pad for entering player tracking information, a display (e.g., a video display screen) for displaying player tracking information, a card reader for entering a magnetic striped card containing player tracking information, and any other devices. The ticket printer may be used to print tickets for a cashless ticketing system. In FIGS. 7, 8A, and 8B, attached to the main door is a payment acceptor 28, a bill validator 30, and a coin tray 38. The payment acceptor may include a coin slot and/or a payment, note, or bill acceptor, where the player inserts money, coins, tokens, or other types of payments.

In some implementations, devices such as readers or validators for credit cards, debit cards, smart cards, or credit slips may facilitate payment. For example, a player may insert an identification card into the card reader of the EGM 2. The identification card may be a smart card coded with a player's identification, credit totals (or related data) and other relevant information. In another example, a player may carry a portable device, such as a cell phone, a radio frequency identification tag or any other suitable wireless device. The portable device may communicates a player's identification, credit totals (or related data), and/or any other relevant information to the EGM 2. In yet another example, money may be transferred to the EGM 2 through electronic funds transfer. When a player funds the EGM 2, a logic device coupled to the EGM 2 may determine the amount of funds entered and display the corresponding amount on a display device.

In some implementations, attached to the main door 8 is a plurality of player-input switches or buttons 32. The input switches can include any suitable devices which enables the player to produce an input signal which is received by the processor. The input switches may include a game activation device that may be used by the player to start any primary game or sequence of events in the EGM 2. The game activation device can be any suitable play activator such as a "bet one" button, a "max bet" button, or a "repeat the bet" button. In some instances, upon appropriate funding, the EGM 2 may begin the game play automatically. Alternately, the EGM 2 may automatically activate game play after detecting user input via the game activation device.

In some implementations, one input switch is a cash-out button. The player may push the cash-out button and cash out to receive a cash payment or other suitable form of payment corresponding to the number of remaining credits. For example, when the player cashes out, the player may receive the coins or tokens in a coin payout tray. As another example, the player may receive other payout mechanisms such as tickets or credit slips redeemable by a cashier (or other suitable redemption system) or funding to the player's electronically recordable identification card. As yet another example, funds may be transferred from the EGM 2 to the player's smart card.

In some implementations, one input switch is a touch screen coupled with a touch screen controller, or some other touch-sensitive display overlay to enable player interaction with the images on the display. The touch screen and the touch screen controller may be connected to a video controller. A player may make decisions and input signals into the gaming machine by touching the touch screen at the appropriate places. One such input switch may include a touch screen button panel.

In some implementations, the EGM 2 may include communication ports for enabling communication of the gaming machine processor, or master gaming controller, with external peripherals, such as external video sources, expansion buses, game or other displays, a SATA port, a key pad, or a network interface for communicating via a network.

In some implementations, the EGM 2 may include one or more display devices. For example, the EGM 2 includes a display device 34 and an information panel 36. The display device 34 and the information panel 36 may each include any of a cathode ray tube, an LCD, a light emitting diode (LED) based display, an organic light emitting diode (OLED) based display, a polymer light emitting diode (PLED) based display, an SED based-display, an E-ink display, a plasma display, a television display, a display including a projected and/or reflected image, or any other suitable electronic display device.

In some implementations, the display devices at the EGM 2 may include one or more electromechanical devices such as one or more rotatable wheels, reels, or dice. The display device may include an electromechanical device adjacent to a video display, such as a video display positioned in front of a mechanical reel. The display devices may include dual-layered or multi-layered electromechanical and/or video displays that cooperate to generate one or more images. The display devices may include a mobile display device, such as a smart phone or tablet computer, that allows play of at least a portion of the primary or secondary game at a location remote from the gaming machine. The display devices may be of any suitable size and configuration, such as a square, a rectangle or an elongated rectangle.

In some implementations, the display devices of the EGM 2 are configured to display wager game images or other suitable images. The images may include symbols, game indicia, people, characters, places, things, faces of cards, dice, and any other images. The images may include a visual representation or exhibition of the movement of objects such as mechanical, virtual, or video reels and wheel. The images may include a visual representation or exhibition of dynamic lighting, video images, or any other images.

In some implementations, the EGM 2 may include a top box 6 which sits on top of the main cabinet 4. The top box 6 may house any of a number of devices, which may be used to add features to a game being played on the EGM 2. These devices may include speakers 10 and 12, display device 45, and any other devices. Furthermore, the top box 6 may house different or additional devices not illustrated in FIGS. 7, 8A, and 8B. For example, the top box may include a bonus wheel or a back-lit silk screened panel which may be used to add bonus features to the game being played on the EGM 2. As another example, the top box 6 may include a display for a progressive jackpot offered on the EGM 2. As yet another example, the top box 6 may include a smart card interaction device. During a game, these devices are controlled and powered, at least in part, by circuitry (e.g. a master gaming controller) housed within the main cabinet 4 of the EGM 2.

In some implementations, speakers 10 and 12 may be located in the top box 6 of the upper region of EGM 2. The speakers 10 and 12 may be mounted with an angled orientation down towards the player and the floor. In one example, the angle is 45 degrees with respect to the vertical, longitudinal axis of EGM 2. In another example, the angle is in a range of 30-60 degrees. In another example, the angle is any angle between 0 and 90 degrees. In some implementations, the angle of speakers in the gaming machine may be adjustable. For instance, speakers may be adjusted to face in a direction more closely approximating an estimated position of a player's head or facial features.

The bill validator 30, player-input switches 32, display screen 34, and other gaming devices may be used to present a wager game on the EGM 2. The devices may be controlled by code executed by the master gaming controller housed inside the main cabinet 4 of the machine 2. The master gaming controller may include one or more processors including general purpose and specialized processors, such as graphics cards, and one or more memory devices including volatile and non-volatile memory. The master gaming controller may periodically configure and/or authenticate the code executed on the EGM 2.

In some implementations, the EGM 2 may include a sound generating device coupled to one or more sounds cards. The sound generating device may include one or more speakers or other sound generating hardware and/or software for generating sounds, such as playing music for the primary and/or secondary game or for other modes of the EGM 2, such as an attract mode. The EGM 2 may provide dynamic sounds coupled with attractive multimedia images displayed on one or more of the display devices to provide an audio-visual representation or to otherwise display full-motion video with sound to attract players to the EGM 2. During idle periods, the EGM 2 may display a sequence of audio and/or visual attraction messages to attract potential players to the EGM 2. The videos may also be customized for or to provide any appropriate information.

In some implementations, the EGM 2 may include a sensor, such as a camera that is selectively positioned to acquire an image of a player actively using the EGM 2 and/or the surrounding area of the EGM 2. The sensor may be configured to capture biometric data about a player in proximity to the EGM 2. The biometric data may be used to implement mechanical and/or digital adjustments to the EGM 2. Alternately, or additionally, the sensor may be configured to selectively acquire still or moving (e.g., video) images. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol, animated avatar, or game indicia.

The EGM 2 is but one example from a wide range of gaming machine designs on which the techniques described herein may be implemented. For example, not all suitable gaming machines have top boxes or player tracking features. Further, some gaming machines have only a single wager game display, while others may have multiple displays.

Figure 9:
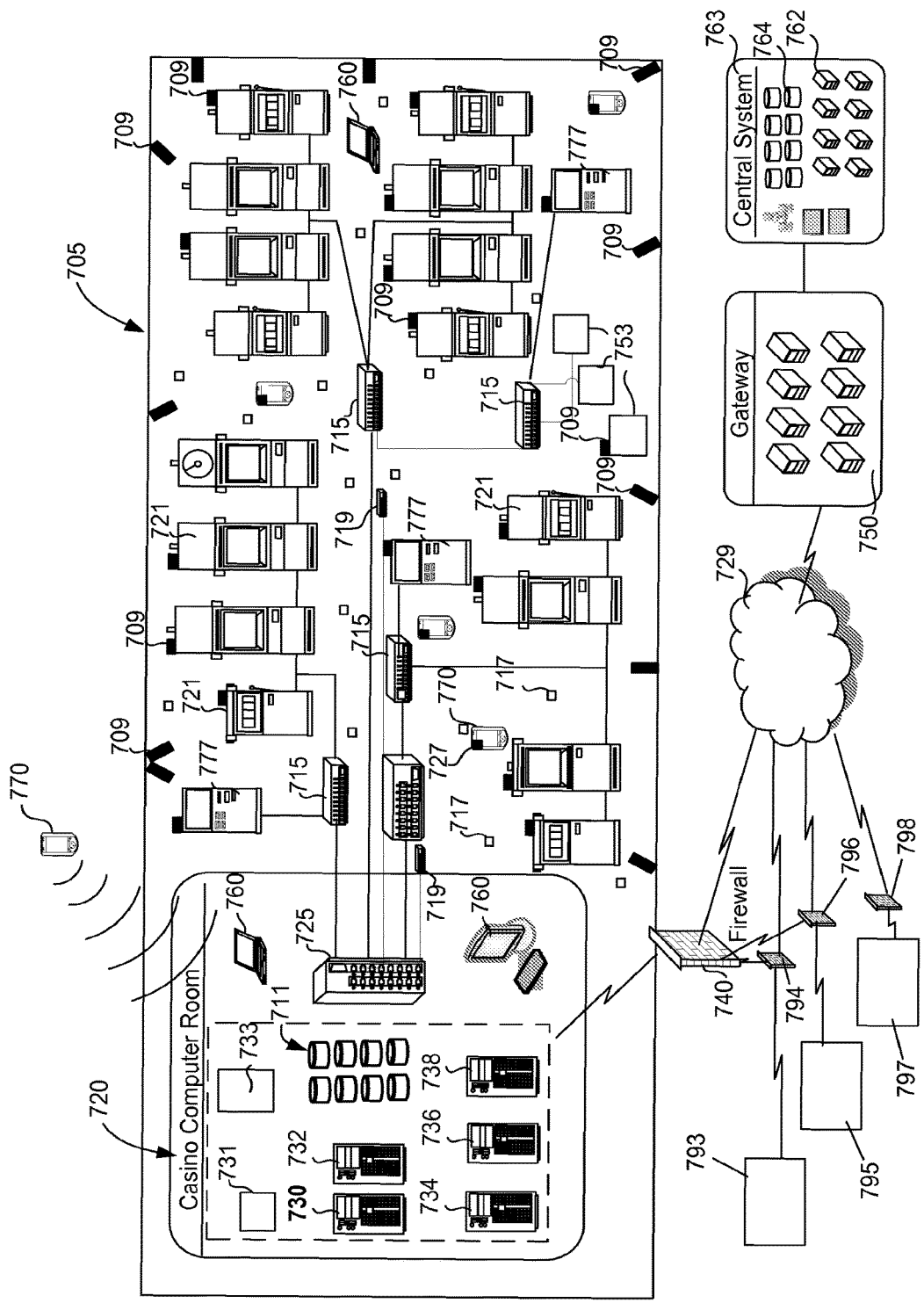
FIG. 9 shows a system diagram of a server-based gaming network, configured in accordance with some implementations.

FIG. 9 shows a system diagram of a server-based (Sb™) gaming network, configured in accordance with some implementations. Those of skill in the art will realize that this architecture and the related functionality are merely examples and that the present disclosure encompasses many other such embodiments and methods.

Here, a casino computer room 720 and networked devices within a gaming establishment 705 are illustrated. The Gaming establishment 705 is configured for communication with a central system 763 via a firewall 740, a network 729 and a gateway 750. Gaming establishments 793, 795 and 797 are also configured for communication with central system 763 via firewalls 794, 796 and 798 respectively, the network 729 and the gateway 750.

In some implementations, two or more gaming establishments may be configured for communication with one another. In this example, the gaming establishments 793 and 795 are configured for communication with the casino computer room 720 in the gaming establishment 705. Such a configuration may allow devices and/or operators in the gaming establishment 705 to communicate with and/or control devices in other casinos. In some such implementations, a server in casino computer room 720 may control devices in gaming establishments 705 as well as devices in the gaming establishments 793 and 795. Conversely, devices and/or operators in the gaming establishments 793 and 795 may communicate with and/or control devices in the gaming establishment 705.

For example, a server of the gaming establishment 705 or the central system 763 may be provisioned with relatively more advanced software (e.g., 3-D facial recognition software) for patron identification than servers of other networked locations. Such a server may process patron identification requests from devices in the gaming establishment 705 as well as patron identification requests from devices in the gaming establishments 793 and 795.

Also as shown in FIG. 9, the gaming establishment 797 is configured for communication with central system 763, but is not configured for communication with other gaming establishments. Some gaming establishments (not shown) may not be in communication with other gaming establishments or with a central system.

The gaming establishment 705 includes multiple gaming machines 721 and networked gaming tables 753. It will be appreciated that a gaming establishment may include hundreds or even thousands of gaming machines 721 and/or gaming tables 753, some of which are connected in a bank and some of which may not be connected to a network. At least some of the gaming machines 721 and/or mobile devices 770 may be "thin clients."

Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 753 may be configured for communication with individual player terminals (not shown), which may be configured to accept bets, present an electronic representation of a dealer, indicate game outcomes, etc.

Gaming establishment 705 also includes networked kiosks 777. Depending on the implementation, kiosks 777 may be used for various purposes, including but not limited to cashing out, prize redemption, redeeming points from a player loyalty program, redeeming "cashless" indicia such as bonus tickets, smart cards, etc. In some implementations, kiosks 777 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present disclosure. For example, in some implementations of the disclosure, kiosks 777 may be configured to receive information from a patron, e.g., by presenting graphical user interfaces.

In this example, each bank 710 has a corresponding switch 715, which may be a conventional bank switch in some implementations. Each switch 715 is configured for communication with one or more devices in the casino computer room 720 via main network device 725, which combines switching and routing functionality in this example. Although various communication protocols may be used, some preferred implementations use the G2S Message Protocol. Other implementations may use the open, Ethernet-based SuperSAS® protocol, which is available from IGT. Still other protocols, including but not limited to Best of Breed ("BOB"), may be used to implement various embodiments of the disclosure. IGT has also developed a gaming-industry-specific transport layer called CASH that rides on top of TCP/IP and offers additional functionality and security.

Here, gaming establishment 705 also includes an RFID network, implemented in part by RFID switches 719 and multiple RFID readers 717. An RFID network may be used, for example, to track objects (such as mobile devices 770, which include RFID tags 727 in this example), patrons, etc., in the vicinity of gaming establishment 705.

As noted elsewhere herein, some implementations of the disclosure may involve "smart" player loyalty instruments, such as player tracking cards, which include an RFID tag. Accordingly, the location of such RFID-enabled player loyalty instruments may be tracked via the RFID network. In this example, at least some of mobile devices 770 may include an RFID tag 727, which includes encoded identification information for the mobile device 770. Accordingly, the locations of such tagged mobile devices 770 may be tracked via the RFID network in gaming establishment 705. Other location-detection devices and systems, such as the global positioning system ("GPS"), may be used to monitor the location of people and/or devices in the vicinity of gaming establishment 705 or elsewhere.

Various alternative network topologies can be used to implement different embodiments of the disclosure and/or to accommodate varying numbers of networked devices. For example, gaming establishments with large numbers of gaming machines 721 may require multiple instances of some network devices (e.g., of main network device 725, which combines switching and routing functionality in this example) and/or the inclusion of other network devices not shown in FIG. 9. Some implementations of the disclosure may include one or more middleware servers disposed between kiosks 777, RFID switches 719 and/or bank switches 715 and one or more devices in the casino computer room 720 (e.g., a corresponding server). Such middleware servers can provide various useful functions, including but not limited to the filtering and/or aggregation of data received from switches, from individual gaming machines and from other devices. Some implementations of the disclosure include load-balancing methods and devices for managing network traffic.

Storage devices 711, Sb™ server 730, License Manager 731, Arbiter 733, servers 732, 734, 736 and 738, host device(s) 760 and main network device 725 are disposed within the casino computer room 720 of gaming establishment 705. In practice, more or fewer devices may be used. Depending on the implementation, some such devices may reside in gaming establishment 705 or elsewhere.

One or more devices in central system 763 may also be configured to perform, at least in part, tasks specific to the present disclosure. For example, one or more servers 762, arbiter 733, storage devices 764 and/or host devices 760 of central system 763 may be configured to implement the functions described in detail elsewhere herein. These functions may include, but are not limited to, providing functionality for devices such as wager gaming machines 721, mobile devices 770, etc.

One or more of the servers of casino computer room 720 may be configured with software for receiving a player's wager gaming notification parameters, determining when a wagering condition corresponds with the wager gaming notification parameters and/or providing a notification to the player when the wagering condition corresponds with the wager gaming notification parameters. Moreover, one or more of the servers may be configured to receive, process and/or provide image data from cameras 709, to provide navigation data to patrons (e.g., to indicate the location of and/or directions to a gaming table, a wager gaming machine, etc., associated with a wager gaming notification), etc.

For example, navigation data (which may include map data, casino layout data, camera image data, etc.) may be provided by one or more of the servers of casino computer room 720 to mobile devices 770. Some implementations of the present disclosure include a plurality of networked cameras 709, which may be video cameras, smart cameras, digital still cameras, etc. In some such implementations, such cameras may provide, at least in part, real-time navigation.

Other devices that may be deployed in gaming establishment 705 do not appear in FIG. 9. For example, some gaming networks may include not only various radio frequency identification ("RFID") readers 717, but also RFID switches, middleware servers, etc., some of which are not depicted in FIG. 9. These features may provide various functions. For example, a server (or another device) may determine a location of a mobile device 770 according to the location of an RFID reader that reads an RFID tag 727.

The servers and other devices indicated in FIG. 9 may be configured for communication with other devices in or outside of gaming establishment 705, such as host devices 760, kiosks 777 and/or mobile devices 770, for implementing some methods described elsewhere herein. Servers (or the like) may facilitate communications with such devices, receive and store patron data, provide appropriate responses, etc., as described elsewhere herein.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the disclosure provide one or more of these servers in the form of blade servers.

Some embodiments of Sb™ server 730 and the other servers shown in FIG. 9 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the disclosure, many of these devices (including but not limited to License Manager 731, servers 732, 734, 736, and 738, and main network device 725) are mounted in a single rack with Sb™ server 730. Accordingly, many or all such devices will sometimes be referenced in the aggregate as an "Sb™ server." However, in alternative implementations, one or more of these devices is in communication with Sb™ server 730 and/or other devices of the network but located elsewhere. For example, some of the devices could be mounted in separate racks within casino computer room 720 or located elsewhere on the network. Moreover, it can be advantageous to store large volumes of data elsewhere via a storage area network ("SAN").

The casino computer room 720 may include one or more operator consoles or other host devices that are configured for communication with other devices within and outside of casino computer room 720. Such host devices may be provided with software, hardware and/or firmware for implementing various embodiments of the disclosure. However, such host devices need not be located within casino computer room 720. Wired host devices 760 (which are desktop and laptop computers in this example) and wireless mobile devices 770 may be located elsewhere in gaming establishment 705 or at a remote location.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

Any of the above implementations may be used alone or together with one another in any combination. Although various implementations may have been motivated by various deficiencies with the prior art, which may be discussed or alluded to in one or more places in the specification, the embodiments do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following claims and their equivalents.

The invention claimed is:

1. A picture-in-picture mixer comprising:
a gaming machine video input configured to receive a gaming machine video signal from a gaming machine;
an external source video input configured to receive an external source video signal from an external source separate from the gaming machine and any components supported by a housing of the gaming machine; and
a picture-in-picture controller configured to:
create a composite video signal based on the external source video signal and the gaming machine video signal;
transmit the created composite video signal to a display device of the gaming machine; and
responsive to receipt of touch screen input data from a touch screen of the gaming machine:
responsive to the touch screen input data being associated with the gaming machine video signal, transmit, via a picture-in-picture control interface distinct from any player tracking component, the touch screen input data to a gaming machine controller of the gaming machine without transmitting the touch screen input data to the external source; and
responsive to the touch screen input data being associated with the external source video signal, transmit, via a player user interface board interface distinct from any player tracking component and distinct from the picture-in-picture control interface, the touch screen input data to the external source without transmitting the touch screen input data to the gaming machine controller of the gaming machine.

2. The picture-in-picture mixer of claim 1, wherein the picture-in-picture controller is further configured to determine whether the touch screen input data is associated with the gaming machine video signal or the external source video signal.

3. The picture-in-picture mixer of claim 1, wherein the external source video signal comprises display data for an external source image and the gaming machine video signal comprises display data for a wagering game image.

4. The picture-in-picture mixer of claim 3, wherein the composite video image comprises both the wagering game image and the external source image.

5. The picture-in-picture mixer of claim 4, wherein the wagering game image is in a first window and the external source image is in a second window.

6. The picture-in-picture mixer of claim 5, wherein the touch screen input data is associated with a touch received at a position on the touch screen that corresponds to the first window, in which case the touch screen input data is associated with the gaming machine video signal, or the second window, in which case the touch screen input data is associated with the external source video signal.

7. The picture-in-picture mixer of claim 1, wherein the picture-in-picture controller is further configured to, responsive to receipt of instructions from the gaming machine controller, create the composite video signal in accordance with the instructions.

8. The picture-in-picture mixer of claim 7, further comprising a picture-in-picture control interface configured to receive the instructions from the gaming machine controller.

9. The picture-in-picture mixer of claim 1, wherein the picture-in-picture controller is further configured to, responsive to receipt of instructions from the external source, request approval from the gaming machine controller to use the instructions and, responsive to receipt of approval, create the composite video signal in accordance with the instructions.

10. A gaming system comprising:
a gaming machine comprising:
a housing;
a display device supported by the housing;
a touch screen supported by the housing, said touch screen configured to receive touch inputs;
a gaming machine controller configured to provide a play of a wagering game; and
a gaming machine video output configured to transmit a gaming machine video signal; and
a picture-in-picture mixer comprising:
a gaming machine video input communicatively connected to the gaming machine video output to receive the gaming machine video signal;
an external source video input configured to receive an external source video signal from an external source separate from the gaming machine and any components supported by the housing of the gaming machine;
a picture-in-picture controller communicatively connected to the gaming machine controller and configured to:
create a composite video signal based on the external source video signal and the gaming machine video signal;
transmit the created composite video signal to the display device; and
responsive to receipt of touch screen input data from the touch screen:
responsive to the touch screen input data being associated with the gaming machine video signal, transmit, via a picture-in-picture control interface distinct from any player tracking component, the touch screen input data to the gaming machine controller of the gaming machine without transmitting the touch screen input data to the external source; and
responsive to the touch screen input data being associated with the external source video signal, transmit, via a player user interface board interface distinct from any player tracking component and distinct from the picture-in-picture control interface, the touch screen input data to the external source without transmitting the touch screen input data to the gaming machine controller of the gaming machine.

11. The gaming system of claim 10, wherein the picture-in-picture controller is further configured to determine whether the touch screen input data is associated with the gaming machine video signal or the external source video signal.

12. The gaming system of claim 10, wherein the external source video signal comprises display data for an external source image and the gaming machine video signal comprises display data for a wagering game image.

13. The gaming system of claim 12, wherein the composite video image comprises both the wagering game image and the external source image.

14. The gaming system of claim 13, wherein the wagering game image is in a first window and the external source image is in a second window.

15. The gaming system of claim 14, wherein the touch screen input data is associated with a touch received at a position on the touch screen that corresponds to the first window, in which case the touch screen input data is associated with the gaming machine video signal, or the second window, in which case the touch screen input data is associated with the external source video signal.

16. The gaming system of claim 10, wherein the picture-in-picture controller is further configured to, responsive to receipt of instructions from the gaming machine controller, create the composite video signal in accordance with the instructions.

17. The gaming system of claim 16, further comprising a picture-in-picture control interface communicatively connected to the gaming machine controller and to the picture-in-picture controller to receive the instructions from the gaming machine controller and transmit the instructions to the picture-in-picture controller.

18. The gaming system of claim 10, wherein the picture-in-picture controller is further configured to, responsive to receipt of instructions from the external source, request approval from the gaming machine controller to use the instructions and, responsive to receipt of approval, create the composite video signal in accordance with the instructions.

19. A method of operating a picture-in-picture mixer, the method comprising:
 creating a composite video signal based on a received external source video signal and a received gaming machine video signal, said external source video signal being received from an external source separate from a gaming machine and any components supported by a housing of the gaming machine;
 transmitting the composite video signal to a display device of the gaming machine; and
 responsive to receipt of touch screen input data from a touch screen of the gaming machine:
  responsive to the touch screen input data being associated with the gaming machine video signal, transmitting, via a picture-in-picture control interface distinct from any player tracking component, the touch screen input data to a gaming machine controller of the gaming machine without transmitting the touch screen input data to the external source; and
  responsive to the touch screen input data being associated with the external source video signal, transmitting, via a player user interface board interface distinct from any player tracking component and distinct from the picture-in-picture control interface, the touch screen input data to the external source without transmitting the touch screen input data to the gaming machine controller of the gaming machine.

20. The method of claim 19, further comprising determining whether the touch screen input data is associated with the gaming machine video signal or the external source video signal.

* * * * *